United States Patent
Yan et al.

(10) Patent No.: US 11,610,161 B2
(45) Date of Patent: Mar. 21, 2023

(54) SKILL VALIDATION

(71) Applicant: Microsoft Technology Licensing, LLC, Redmond, WA (US)

(72) Inventors: Xiao Yan, Sunnyvale, CA (US); Jaewon Yang, Sunnyvale, CA (US); Mikhail Obukhov, Mountain View, CA (US); Lin Zhu, Santa Clara, CA (US); Joey Bai, Sunnyvale, CA (US); Shiqi Wu, Sunnyvale, CA (US); Qi He, San Jose, CA (US); Farzard Eskafi, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 215 days.

(21) Appl. No.: 16/521,141

(22) Filed: Jul. 24, 2019

(65) Prior Publication Data
US 2021/0027233 A1    Jan. 28, 2021

(51) Int. Cl.
   *G06Q 30/00*  (2023.01)
   *G06Q 10/0631*  (2023.01)
   (Continued)

(52) U.S. Cl.
   CPC ..... *G06Q 10/063112* (2013.01); *G06F 17/18* (2013.01); *G06N 20/00* (2019.01); *G06Q 10/1053* (2013.01)

(58) Field of Classification Search
   CPC ....... G06Q 10/063112; G06Q 10/1053; G06Q 10/06395; G06Q 10/00; G06Q 10/02;
   (Continued)

(56) References Cited

U.S. PATENT DOCUMENTS

2004/0030566 A1*  2/2004  Brooks Rix ........... G06Q 10/10
                                                            705/321
2007/0156760 A1*  7/2007  McCall ................. G06F 16/285
                          (Continued)

OTHER PUBLICATIONS

Dave, Vachik & Zhang, Baichuan & Hasan, Mohammad & Aljadda, Khalifeh & Korayem, Mohammed. (2018). A Combined Representation Learning Approach for Better Job and Skill Recommendation. 10.1145/3269206.3272023. (Year: 2018).*

*Primary Examiner* — Robert D Rines
*Assistant Examiner* — Jay-Ming Wang
(74) *Attorney, Agent, or Firm* — Schwegman, Lundberg & Woessner, P.A.

(57) ABSTRACT

Apparatuses, computer readable medium, and methods are disclosed for verifying skills of members of an online connection network. The apparatus, computer readable medium, and methods may include a method including responding to a first member of the online connection network indicating a skill possessed by the first member by selecting a skill verification user interface (UI) to present to a second member of the online connection network where the first member and the second member are connected via the online connection network. The method may further include presenting the skill verification UI to the second member, where the skill verification UI presents an indication of the first member, an indication of the skill, and a query regarding a competence level of the skill possessed by the first member. The method may further include receiving a response to the query and determining a skill validation value of the skill for the first member based on the response and a machine learning model.

19 Claims, 24 Drawing Sheets

(51) Int. Cl.
*G06F 17/18* (2006.01)
*G06N 20/00* (2019.01)
*G06Q 10/1053* (2023.01)

(58) Field of Classification Search
CPC ........ G06Q 10/06; G06Q 10/10; G06Q 30/02; G06N 20/00; G06F 17/18; G05B 2219/31357
See application file for complete search history.

(56) References Cited

U.S. PATENT DOCUMENTS

| | | | |
|---|---|---|---|
| 2009/0287532 A1* | 11/2009 | Cohen | G06Q 30/0601 705/7.14 |
| 2011/0276507 A1* | 11/2011 | O'Malley | G06Q 10/00 705/321 |
| 2013/0297372 A1* | 11/2013 | Rix | G06Q 10/10 705/321 |
| 2014/0075004 A1* | 3/2014 | Van Dusen | G06Q 50/01 709/223 |
| 2014/0180025 A1* | 6/2014 | Stivoric | A61B 5/0826 600/300 |
| 2015/0248649 A1* | 9/2015 | Avats | G06Q 10/1053 705/321 |
| 2016/0162478 A1* | 6/2016 | Blassin | G06Q 10/063112 706/12 |
| 2017/0091692 A1* | 3/2017 | Guo | G06F 16/5854 |
| 2018/0089607 A1* | 3/2018 | Iu | G06F 16/9535 |
| 2018/0121857 A1* | 5/2018 | Gutman | G16H 15/00 |

* cited by examiner

SKILL VALIDATION

TECHNICAL FIELD

Some embodiments pertain to validating skills indicated in profiles of members of an online connection network. Some embodiments pertain to determining and presenting user interfaces (UIs) to members of an online connection network to verify skills of other members of the online connection network. Some embodiments pertain to training and using machine learning models to evaluate skill levels of skills indicated in an online profile of members of a social network system.

BACKGROUND

A connection network system may include hundreds of millions or billions of members. Much of the value of an online connection network system is suggesting or determining which members to connect with one another. However, the benefits of connecting members with another may be reduced if the connection network system does not have an accurate representation of the skills of the members.

DETAILED DESCRIPTION

Figure 1:
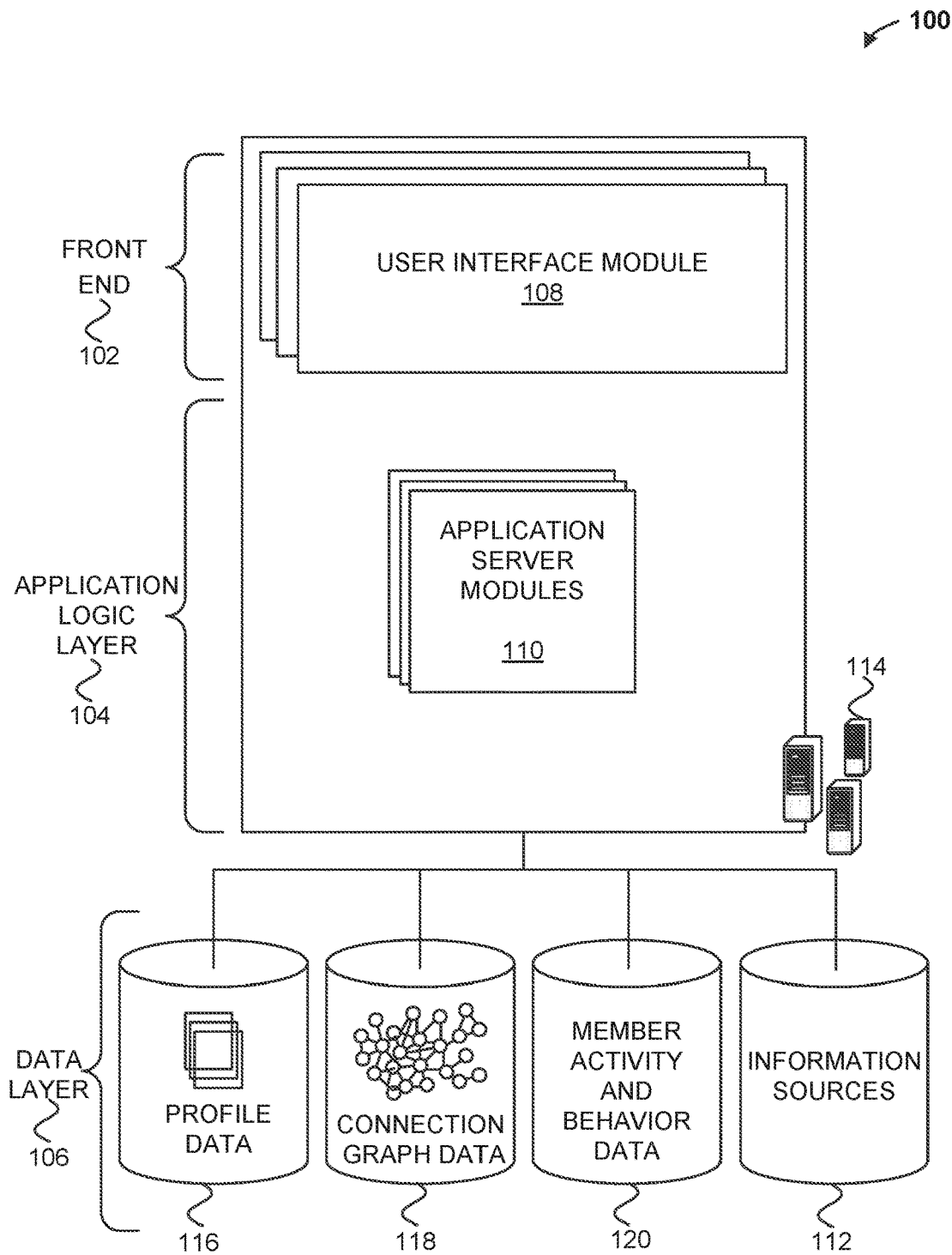
FIG. 1 is a block diagram of a connection network system, in accordance with some embodiments.

The present disclosure describes methods, systems and computer program products for identifying and generating relevant content items. In the following description, for purposes of explanation, numerous specific details are set forth in order to provide a thorough understanding of the various aspects of different embodiments of the present invention. It will be evident, however, to one skilled in the art, the at the present invention may be practiced without all of the specific details and/or with variations permutations and combinations of the various features and elements described herein.

A systems, methods, and computer readable media are provided that validate skills of members of an online connection network. Members of an online connection network may indicate skills, e.g., computer language skills, marketing skills, etc., that they believe they have in an online profile. Additionally, other members may endorse a member for a skill. Members may be matched to other members based on the skills. For example, a recruiter may be interested in finding members with a particular set of skills for job openings. However, matching the members based on skills is only effective if the members have accurately assessed the skills that they have. Empirical evidence indicates that members often indicate they have skills when, in fact, they do not have the skill or their competence level is low. And members often endorse other members for skills when they do not know the competence level of the skill the member possess. The members may intentionally misrepresent the skills that they have or may not accurately know whether they possess a skill. Often, members are overconfident about their expertise for a skill. Moreover, it may be difficult to determine a ground truth for whether a member actually has a skill. And it may be very expensive to determine the skill level of members by a manual method such as hiring people to determine the skill level of the members. Additionally, the skills may be outdated. The technical problem is how to validate whether a member actual has a skill the member claims to have by use of an online connection network system.

Some embodiments generate user interfaces (UI) to query other members regarding the skills of the member. The selection of which members to query and when to query the member is a difficult technical problem. Members patience for answering queries is low. The value of the online connection network system is reduced when members have to spend time that is not directly productive to the them. Moreover, it is difficult to get a high response rate from members for some of the UIs provided. Additionally, it may be difficult to get an accurate assessment of a member's skill from another member, who may be called a viewer.

Another technical problem is how to train machine learning models to select members to evaluate other members and to evaluate whether a member possess a skill. Some embodiments use a golden dataset to train machine learning models. The golden dataset is generated based on finding members who applied for a job listed in a job opening posted on the online connection network and were hired for the job. The job posting lists the skills required for the job and thus can be used to verify that a member actually possesses the skills. The cost to manually verify member skill pairs is prohibitive.

The machine learning models are trained with the golden dataset to generate a skill validation value given a skill and a member. Features to use to train the machine learning models are determined from data collected by the online connection network system regarding the skills and the members and use of the golden dataset. Additionally, machine learning models are trained to identify members that are both qualified to evaluate whether a member has a skill and who are likely to response when presented with a UI query regarding the member and skill.

FIG. 1 is a block diagram of an online connection network system 100, in accordance with some embodiments. The online connection network system 100 may be based on a three-tiered architecture, comprising a front-end layer 102, application logic layer 104, and data layer 106. Some embodiments implement the online connection network system 100 using different architectures. The online connection network system 100 may be implemented on one or more computers 114. The computers 114 may be servers, personal computers, laptops, portable devices, etc. The computers 114 may be distributed across a network. The online connection network system 100 may be implemented in a combination of software, hardware, and firmware.

As shown in FIG. 1, the front end 102 includes user interface modules 108. The user interface modules 108 may be one or more web services. The user interface modules 108 receive requests from various client-computing devices, and communicate appropriate responses to the requesting client devices. For example, the user interface modules 108 may receive requests in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 1, the data layer 106 includes profile data 116, connection graph data 118, member activity and behaviour data 120, and information sources 112. Profile data 116, connection graph data 118, and member activity and behaviour data 120, and/or information sources 112 may be databases. One or more of the data layer 106 may store data relating to various entities represented in a connection graph. In some embodiments, these entities include members, companies, and/or educational institutions, among possible others. Consistent with some embodiments, when a person initially registers to become a member of the online connection network system 100, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current position title including name of company, position description, industry, employment history, skills, professional organizations, and so on. This information is stored as part of a member's member profile, for example, in profile data 116. The data layer 106 may include companies 212, jobs 208, 502, members 210, talent seekers 302, job seekers 402, etc.

With some embodiments, a member's profile data will include not only the explicitly provided data, but also any number of derived or computed member profile attributes and/or characteristic, which may become part of one of more of profile data 116, connection graph data 118, member activity and behaviour data 110, and/or information sources 112.

Once registered, a member may invite other members, or be invited by other members, to connect via the connection network service. A company may be a member. A "connection" may require a bi-lateral agreement by the members, such that both members acknowledge the establishment of the connection, e.g., connections 318 or connection 418. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the connection graph data 118. With some embodiments the connection graph data 118 may be implemented with a graph database, which is a particular type of database that uses graph structures with nodes, edges, and properties to represent and store data. In this case, the connection graph data 118 reflects the various entities that are part of the connection graph, as well as how those entities are related with one another.

With various alternative embodiments, any number of other entities might be included in the connection graph data 118, and as such, various other databases may be used to store data corresponding with other entities. For example, although not shown in FIG. 1, consistent with some embodiments, the system may include additional databases for storing information relating to a wide variety of entities, such as information concerning various online or offline people, position announcements, companies, groups, posts, job posts, slide shares, and so forth.

With some embodiments, the application server modules 110 may include one or more activity and/or event tracking modules, which generally detect various user-related activities and/or events, and then store information relating to those activities/events in, for example, member activity and behaviour data 110. For example, the tracking modules may identify when a user makes a change to some attribute of his or her member profile, or adds a new attribute and may trigger waterloo member-attribute processor to store the change in member activity and behaviour data 110. Additionally, a tracking module may detect the interactions that a member has with different types of content. For example, a tracking module may track a member's activity with respect to position announcements, e.g. position announcement views, saving of position announcements, applications to a position in a position announcement, explicit feedback regarding a position announcement (e.g., not interested, not looking, too junior, not qualified, information regarding the position the member would like, a location member wants to work, do not want to move, more like this, etc.), position search terms that may be entered by a member to search for position announcements.

Such information may be used, for example, by one or more recommendation engines to tailor the content presented to a particular member, and generally to tailor the user experience for a particular member. Information sources 112 may be one or more additional information sources. For example, information sources 112 may include external sources that include job posting and company information that may be used by import jobs module 202 to generate jobs 208.1.

The application server modules 110, which, in conjunction with the user interface module 108, generate various user interfaces (e.g., web pages) with data retrieved from the data layer 106. In some embodiments, individual application server modules 110 are used to implement the functionality associated with various applications, services and features of the connection network service. For instance, a messaging application, such as an email application, an instant messaging application, or some hybrid or variation of the two, may be implemented with one or more application server modules 110. Of course, other applications or services may be separately embodied in their own application server modules 110. In some embodiments applications may be implemented with a combination of application service modules 120 and user interface modules 108. For example, contact talent seeker module 902 or confirm job module 1002 may be implemented with a combination of back-end modules, front-end modules, and modules that reside on a user's computer (not illustrated). For example, the online connection network system 100 may download a module to a web browser running on a user's computer, which may communicate with an application server module 110 running on a server 114 which may communicate with a module running on a back-end database server (not illustrated).

The online connection network system 100 may provide a broad range of applications and services that allow members the opportunity to share and receive information, often customized to the interests of the member. For example, in some embodiments, the online connection network system 100 may include determine skill verification module 218 and skill validation prediction module 222, which may be application server modules 110.

With some embodiments, members of a connection network service may be able to self-organize into groups, or interest groups, organized around a subject matter or topic of interest. Accordingly, the data for a group may be stored in connection graph data 118. When a member joins a group, his or her membership in the group may be reflected in the connection graph data 118. In some embodiments, members may subscribe to or join groups affiliated with one or more companies. For instance, with some embodiments, members of the connection network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the connection graph and modelled with the connection graph data 118.

In some embodiments, the online connection network system 100 may include identify talent seeker module 216, which includes or has an associated publicly available API that enables third-party applications to invoke the functionality of the respective module or application. The members of the online connection network system 100 may manage their professional profiles, organize their connections, learn new courses, read articles, browse job postings, search for other members, etc.

In some embodiments the online connection network system 100 is a social networking system. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the disclosed embodiments with unnecessary detail, various functional modules and engines that are not germane to conveying an understanding of the inventive subject matter have been omitted from FIG. 1. However, a skilled artisan will readily recognize that various additional functional modules and engines may be used with a connection network system, such as that illustrated in FIG. 1, to facilitate additional functionality that is not specifically described herein. Furthermore, the various functional modules and engines depicted. in FIG. 1 may reside on a single server computer or may be distributed across several server computers in various arrangements. Moreover, although depicted in FIG. 1 as a three-tiered architecture, the disclosed embodiments are by no means limited to such architecture.

Figure 2:
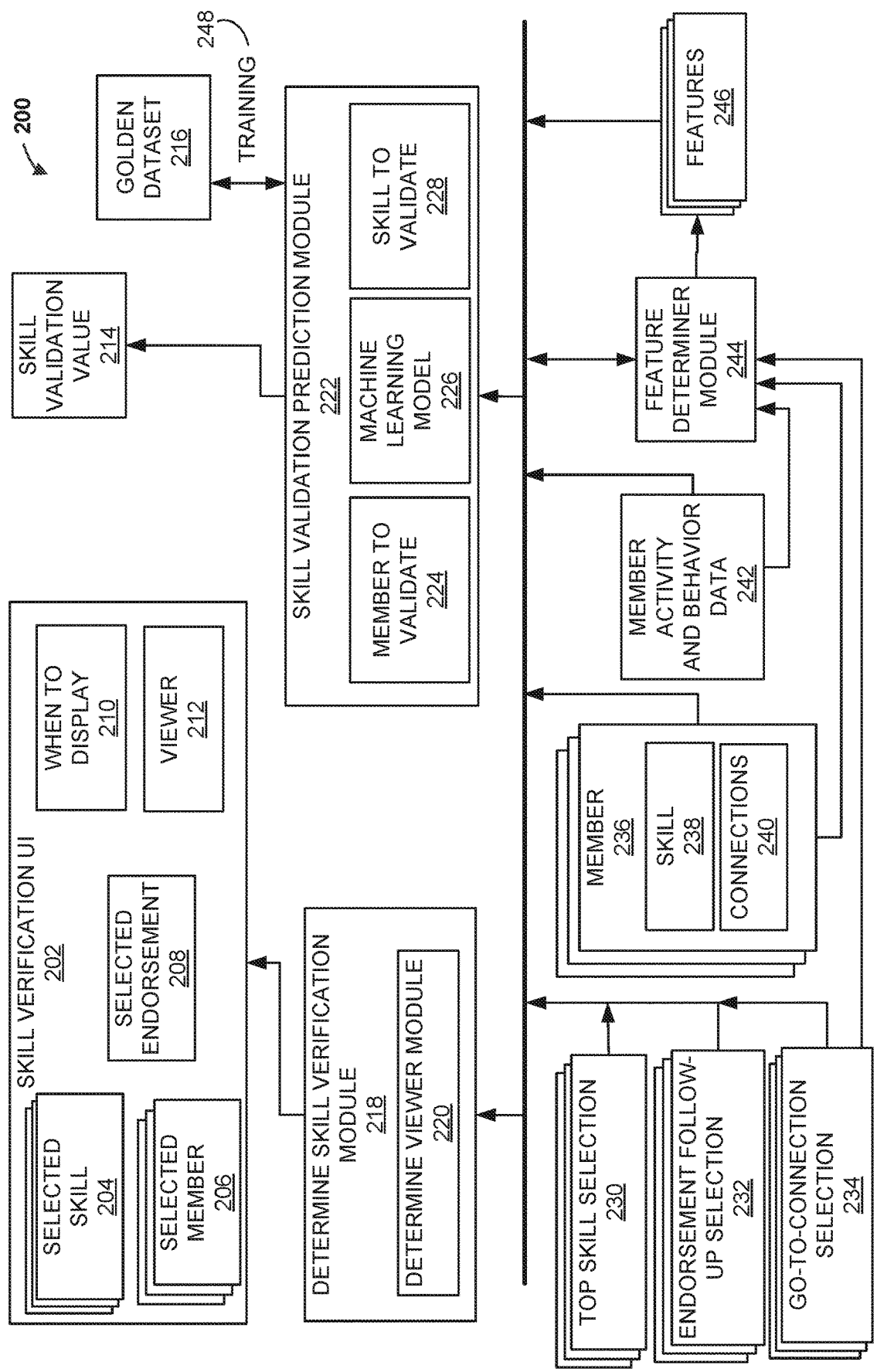
FIG. 2 illustrates a system for skill validation, in accordance with some embodiments.

FIG. 2 illustrates a system 200 for skill validation, in accordance with some embodiments. Illustrated in FIG. 2 is skill verification UI 202, selected skill 204, selected member 206, selected endorsement 208, when to display 210, viewer 212, skill validation value 214, golden dataset 216, determine skill verification module 218, determine viewer module 220, skill validation prediction module 222, member to validate 224, machine learning model 226, skill to validate 228, top skill selection 230, endorsement follow-up selection 232, go-to-connection selection 234, member 236, skill 238, connections 240, member activity and behaviour data 242, feature determiner module 244, features 246, and training 248.

Golden dataset 216 is used to train the skill validation prediction module 222 and determine viewer module 220. The golden dataset 216 is generated for ground truth data. The golden dataset 216 is generated from members 236 who viewed or applied for a job in a job posting (not illustrated) posted on the online connection network system 100. The member 236 is a confirmed hire of the job. The system 200, e.g., feature determiner module 244, matches the skills listed as requirements of the job posting with the skills 238 of the member 236. The skills 238 that were required to be hired for the job are considered to be a ground truth or to be verified skills 238 for the member 236.

Determine skill verification module 218 may determine a skill verification UI 202 to present to a viewer 212 at a time of when to display 210 in order to verify a selected skill 204 of a selected member 206. The viewer 212 is a member 236 selected to view the skill verification UI 202. The skill verification UI 202 is one of endorsement follow-up UI 300, 400, 500, go-to-connection UI 700, 800, top skill UI 1000, or another skill verification UI 202. The selected skill 204 is a skill 238 of a selected member 236. The selected member 206 is a member 236. The selected endorsement 208 is an endorsement 1202 (FIG. 12) that viewer 212 made for selected member 206. Determine viewer module 220 is configured to determine which member 236 to select as the selected members 206 for the skill verification UI 202, e.g., selected members 705 of FIG. 7. In some embodiments, determine skill verification module 218 is configured to select viewer 212 from connections 240 of the selected member 206. A number of selected members 206 varies depending on the skill verification UI 202. In some embodiments, determine verification module 218 is configured to select viewer 212 from first-degree connections 1214 (FIG. 12) of a selected member 206. The skill verification UI 202 is presented to the viewer 212 at a time based on when to display 210 and generates result data of top skill selection 230, endorsement follow-up selection 232, or go-to-connection selection 234.

Determine skill verification module 218 may order the selected skills 204 and/or the selected members 206 to indicate an order the selected skills 204 and/or selected members 206 should be displayed in. Determine skill verification module 218 selects endorsement follow-up UI 300, 400 after the viewer 212 has provided an endorsement 1202 (FIG. 12) for a selected skill 204 of the selected member 206.

When to display 210 indicates when the skill verification UI 202 should be displayed to the viewer 212. When to display 210 may be an event such as when viewer 212 views a profile 1218 (FIG. 12) of a member 236, a time such as a next time the viewer 212 is active within the online connection network system 100, or another indication of when to present the skill verification UI 202. In some embodiments, the skill verification UI 202 is displayed to the viewer 212 when the viewer 212 is viewing a profile 1218 of the selected member 206 (e.g., composed of fields of member 236 ). For example, when viewer 212 is viewing the profile of selected member 206, then determine skill verification module 218 may determine to display endorsement follow-up UI 300, 400, 500, go-to-connection UI 700 or top skill UI 1000.

Determine viewer module 220 determines the selected member 206 or selected members 206 for the skill verification UI 202. For example, determine viewer module 220 determines the selected members 705 go-to-connection UI 700. In some embodiments, the selected members 206 are referred to as positions 0 through N, where N may be from 2 to a. number of connections of the viewer 212, e.g., first-degree connections 1214. In some embodiments, a selected member 206 at position 0 is a first selected member 206 displayed to the viewer 212 by the skill verification UI 202. Additionally, the selected members 206 may be assigned positions (e.g., 0 through N), which may be used by skill verification UI 202 to determine the positions to display the selected members 206 to the viewer 212. The selected member 206 at position 0 may be a member 236 whose profile 1218 the viewer 212 is currently viewing.

Skill validation prediction module 222 is configured to determine a skill validation value 214 based on a member to validate 224 and a skill to validate 228. The member to validate 224 is a member 236 and the skill to validate 228 is a skill 236 of the member 236 (see FIG. 12). The skill validation value 214 may be the same or similar as skill validation 1208 and/or validation label 1204 as disclosed in conjunction with FIG. 12. The skill validation value 214 may be based on training 248 of the machine learning model 226 using the golden dataset 216 and features 246. Skill validation prediction module 222 may base the skill validation value 214 on the training 248, top skill selections 230, endorsement follow-up selections 232, go-to-connection selections 234, members 236, member activity and behaviour data 242, and/or features 246.

Member 236 may be a member of the online connection network system 100. For example, member 236 may be a person with an account on the online connection network system 100. In some embodiments the online connection network system 100 has 100's of millions or billions of members 236. The member 236 may be the same or similar as member 236 of FIG. 12.

Skill 238 may be tools such as "MATLAB", "Python", etc.; industrial knowledge such as "Machine Learning"; "Artificial Intelligence", etc.; soft skills such as "Presentation", "Technical Writing", etc.; or, another type of skill. Skill 238 may be the same or similar as skill 238 of FIG. 12. Feature determiner module 244 may determine one or more of the features 246 (FIG. 13) from top skill selections 230, endorsement follow-up selections 232, go-to-connection selections 234, members 236, and/or member activity and behaviour data 242.

In some embodiments, a social signal is a recorded action that a first member 236 performs with regard to a second member 236. For example, a social signal may be the top skill selection 230, endorsement follow-up selection 232, go-to-connection selection 234; and/or other signals such as the first member 236 viewing a profile 1218 of the second member 236, the first member 236 connecting with the second member 236 to create a first-degree connection 1216, or the first member 236 endorsing (generating an endorsement 1202 ) the second member 236 for a skill 238.

In some embodiments skill validation prediction module 222 is configured to estimate the skill validation value 214 by compensating for certain behaviours such as not rating very active members 236 with higher skill validation values 214 than less active members 236. The feature determiner module 244 may determine a feature 246 of activity level and then the training 248 may determine that activity level is not a good predictor for a skill validation value 214. Additionally, the system 200 is configured to estimate the skill validation value 214 across many different types or category of skills 238, e.g., industrial knowledge, computer programming language skills, soft skills such as writing, etc. The feature determiner module 244 may determine categories of skill 238 and thus the training 248 of the skill validation prediction module 222 may be different for different categories or types of skills 238.

Figure 3:
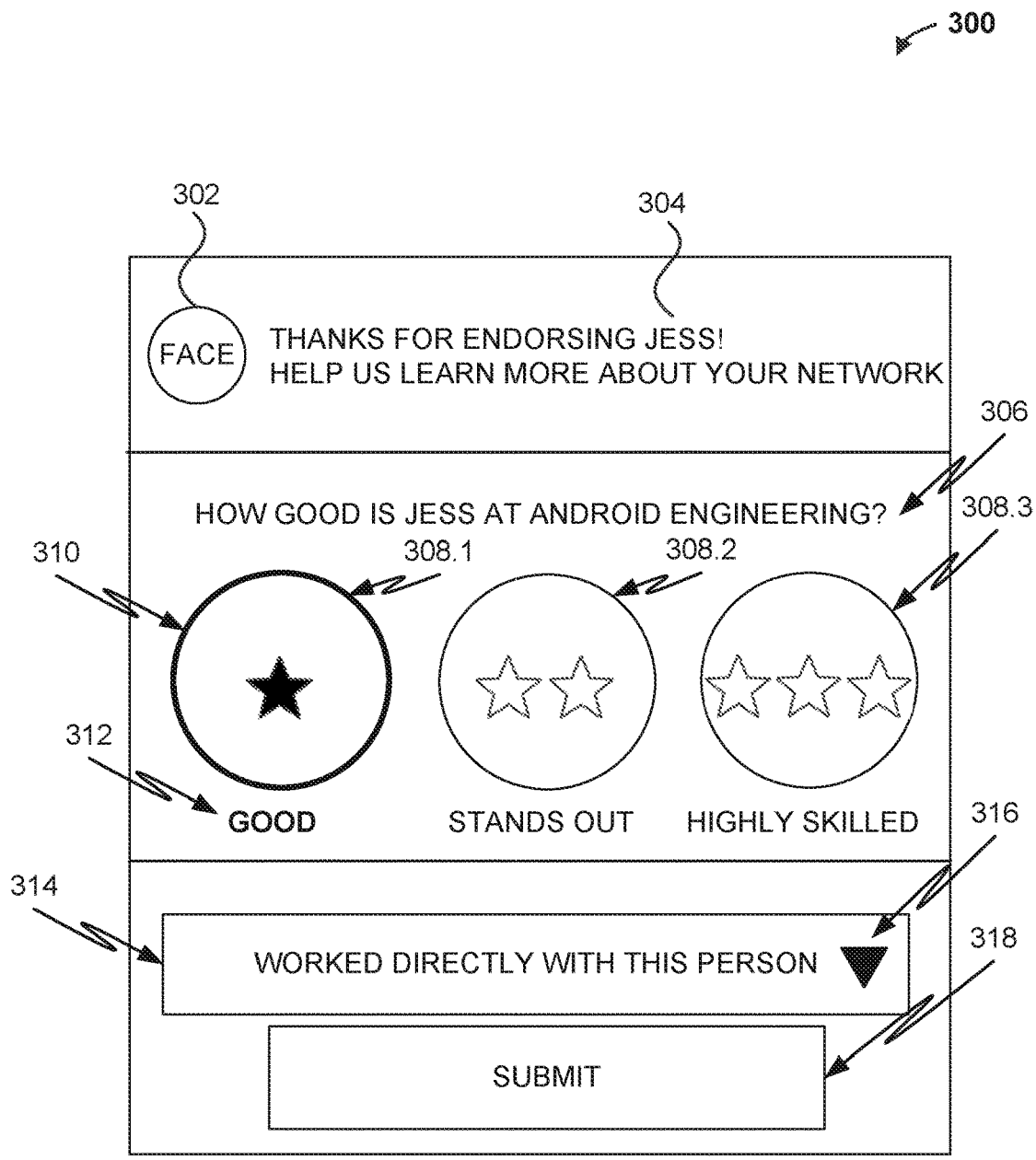
FIG. 3 illustrates an endorsement follow-up UI, in accordance with some embodiments.
Figure 5:
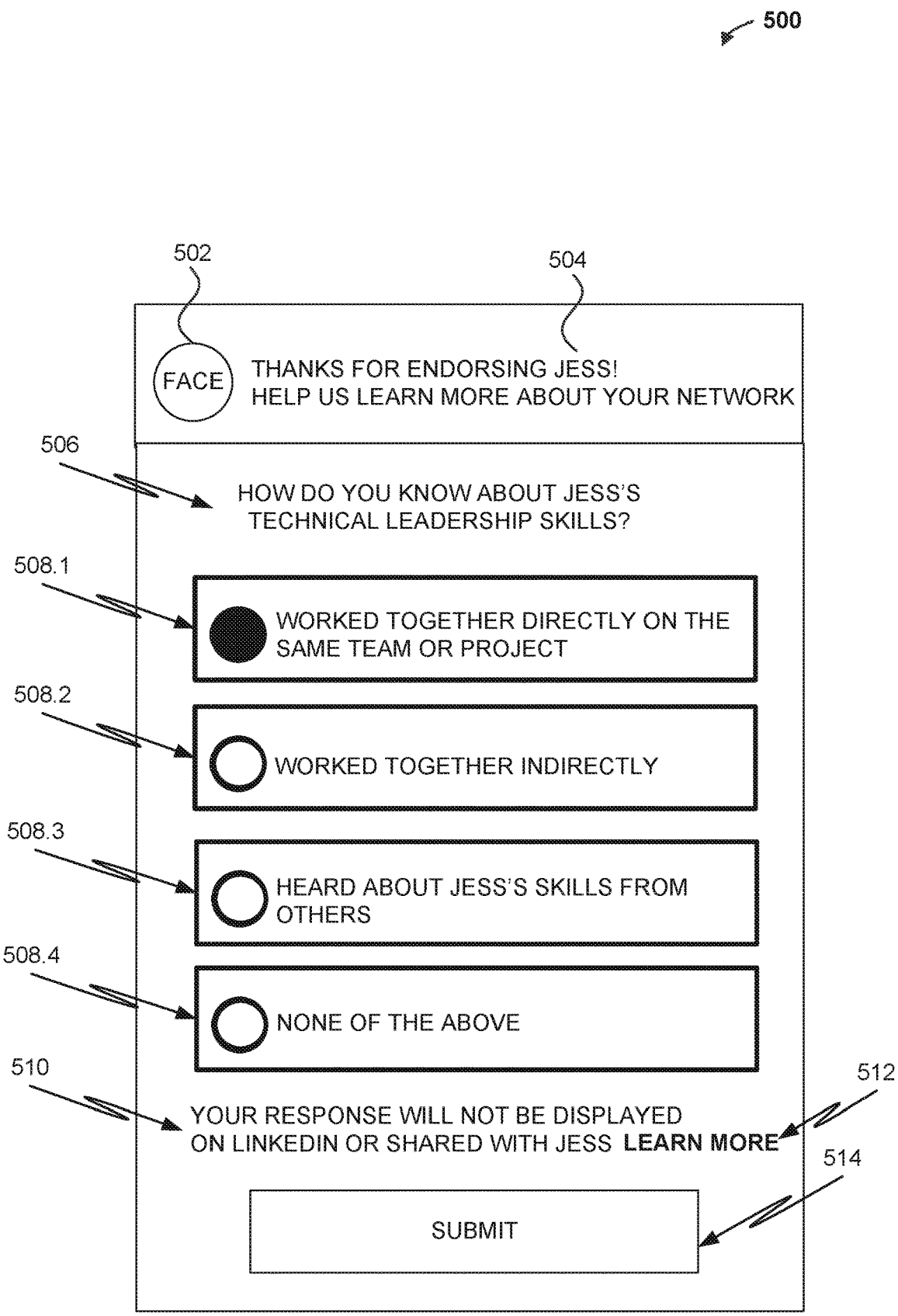
FIG. 5 illustrates an endorsement follow-up UI, in accordance with some embodiments.

FIG. 3 illustrates an endorsement follow-up UI 300, in accordance with some embodiments. Illustrated in FIG. 3 is face 302, request 304, question 306, selection options 308, selected option 310, selected category 312, relationship 314, pull-down menu 316, and submit button 318. The endorsement follow-up UI 300 is based on a skill verification UI 202 for a selected member 206, selected skill 204, selected endorsement 208, and viewer 212. The face 302 is the face of the selected member 206, e.g., the face 1210 of member 236 with name 1212 "Jess". The request 304 may be text that provides context for the endorsement follow-up 300, e.g., "Thanks for Endorsing Jess! Help us learn more about your network." The request 304 includes the name 1212 (FIG. 12) of the selected member 206. The question 306 is the question that is being asked of the viewer 212, e.g., "How good is Jess at Android Engineering?" The selection options 308 are options for the viewer 212 to select, e.g., as illustrated one star ("Good") 308.1, two stars ("Stands Out") 308.2, or three stars ("Highly Skilled") 308.3. Selected option 310 indicates the selection option 308 that was selected by the viewer 212, e.g., as illustrated one star ("Good") 308.1. Relationship 314 indicates the relationship between the viewer 212 and the selected member 206. The pull-down menu 316 enables the viewer 212 to select a different relationship, e.g., FIG. 5 illustrates different relationships. Submit 318 enables the viewer 212 to make the selected option 310 with the indicated relationship 314. In some embodiments a different number of selection options 308 is used.

Figure 4:
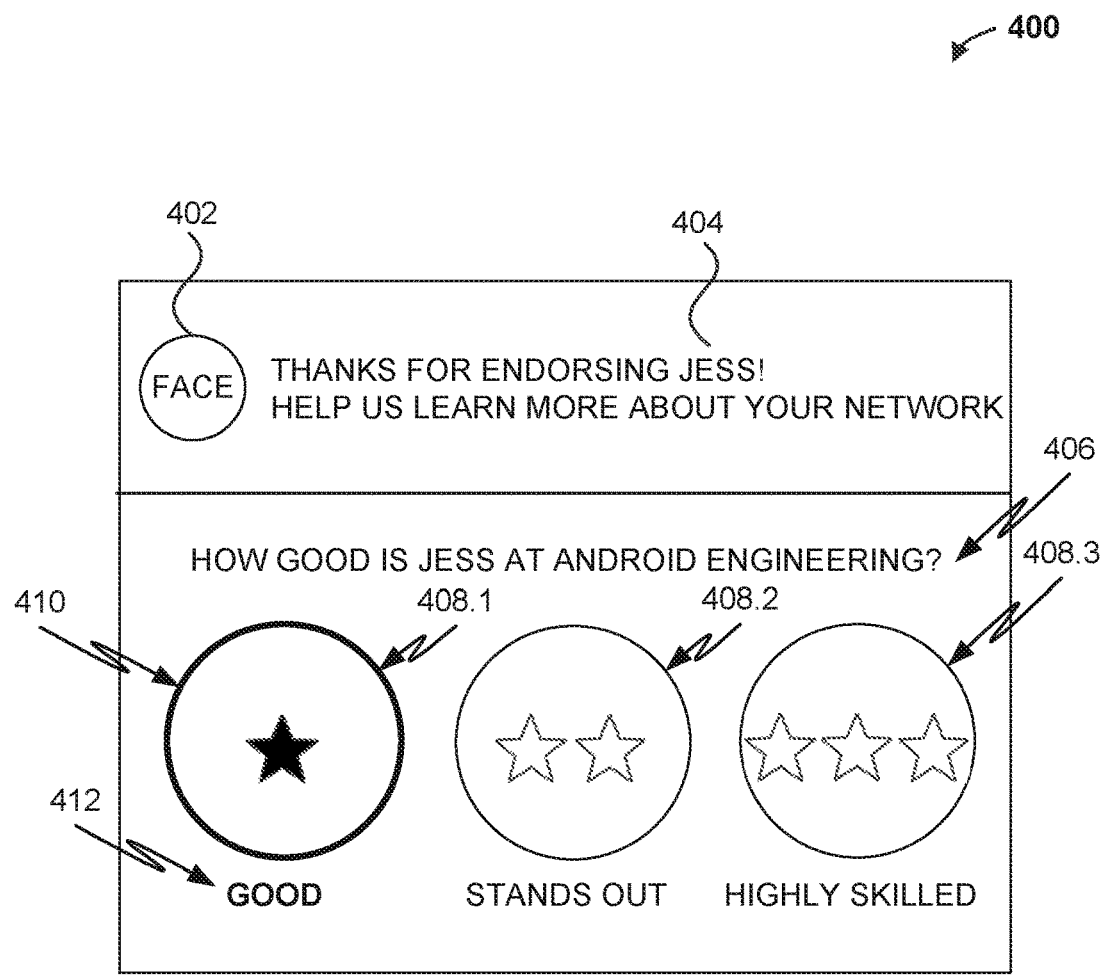
FIG. 4 illustrates an endorsement follow-up UI, in accordance with some embodiments.

FIG. 4 illustrates an endorsement follow-up UI 400, in accordance with some embodiments. FIG. 4 is a two-part endorsement follow-up UI 400 compared with the one-part endorsement follow-up 300 as illustrated in FIG. 3. Illustrated in FIG. 4 is face 402, request 404, question 406, selection options 408, selected option 410, and selected category 412.

Face 402 may be the same or similar as face 302. Request 404 may be the same or similar as request 304. Question 406 may be the same or similar as question 306. Selection options 408 may be the same or similar as selection options 308. Selected option 410 may be the same or similar as selected option 310. Selected category 412 may be the same or similar as selected category 312. In some embodiments, when the viewer 212 selects one of the selection options 408, e.g., as illustrated selected option 410, then the endorsement follow-up UI 500 is presented to the viewer 212. In some embodiments a different number of selection options 408 is used.

FIG. 5 illustrates an endorsement follow-up UI 500, in accordance with some embodiments. Illustrated in FIG. 5 is face 502, request 504, question 506, relationship selections 508, privacy message 510, privacy button 512, and submit button 514. The face 502 is the same or similar as face 402. The question 506 is introductory text for the viewer 212 and may contain a thank you for completing endorsement follow-up 400. Question 506 is the question being asked of the viewer 212, e.g., "How do you know about Jess's technical leadership skills?". Relationship selections 508 are the possible responses to the question 506. Privacy message 510 is a message regarding privacy. Privacy button 512 is a button that when pressed provides additional information regarding privacy. Submit button 514 submits the selection of the viewer 212. As illustrated the viewer 212 has selected "Worked together directly on the same team or project."

Figure 6:
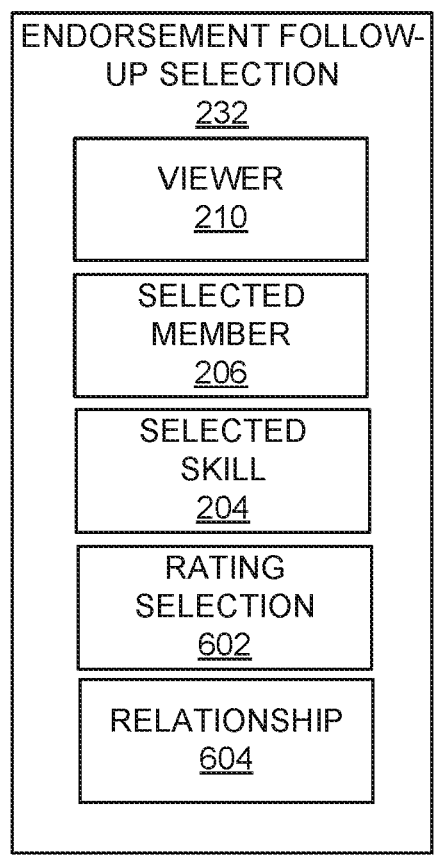
FIG. 6 illustrates an endorsement follow-up selection, in accordance with some embodiments.

FIG. 6 illustrates an endorsement follow-up selection 232, in accordance with some embodiments. Illustrated in FIG. 6 is endorsement follow-up selection 232, viewer 210, selected member 206, selected skill 204, rating selection 602, and relationship 604. Endorsement follow-up selection 302 may be the data that is stored as a result of an endorsement follow-up UI 300, 400, 500 being presented to a viewer 212. The viewer 212 may be the same or similar as viewer 212 of FIG. 2. The selected member 206 may be the same or similar as selected member 206 of FIG. 2. The selected skill 204 may be the same or similar as selected skill 204 of FIG. 2. Rating selection 602 may be the selection that the viewer 212 made, e.g., selected option 310, 410. Relationship 604 may be a selected relationship 314 or relationship selections 508 where the viewer 212 has made a selection, e.g., 508.1. in some embodiments, relationship 604 may additionally indicate a connection between the viewer 210 and selected member 206, e.g., first-degree connection 1216.

Figure 7:
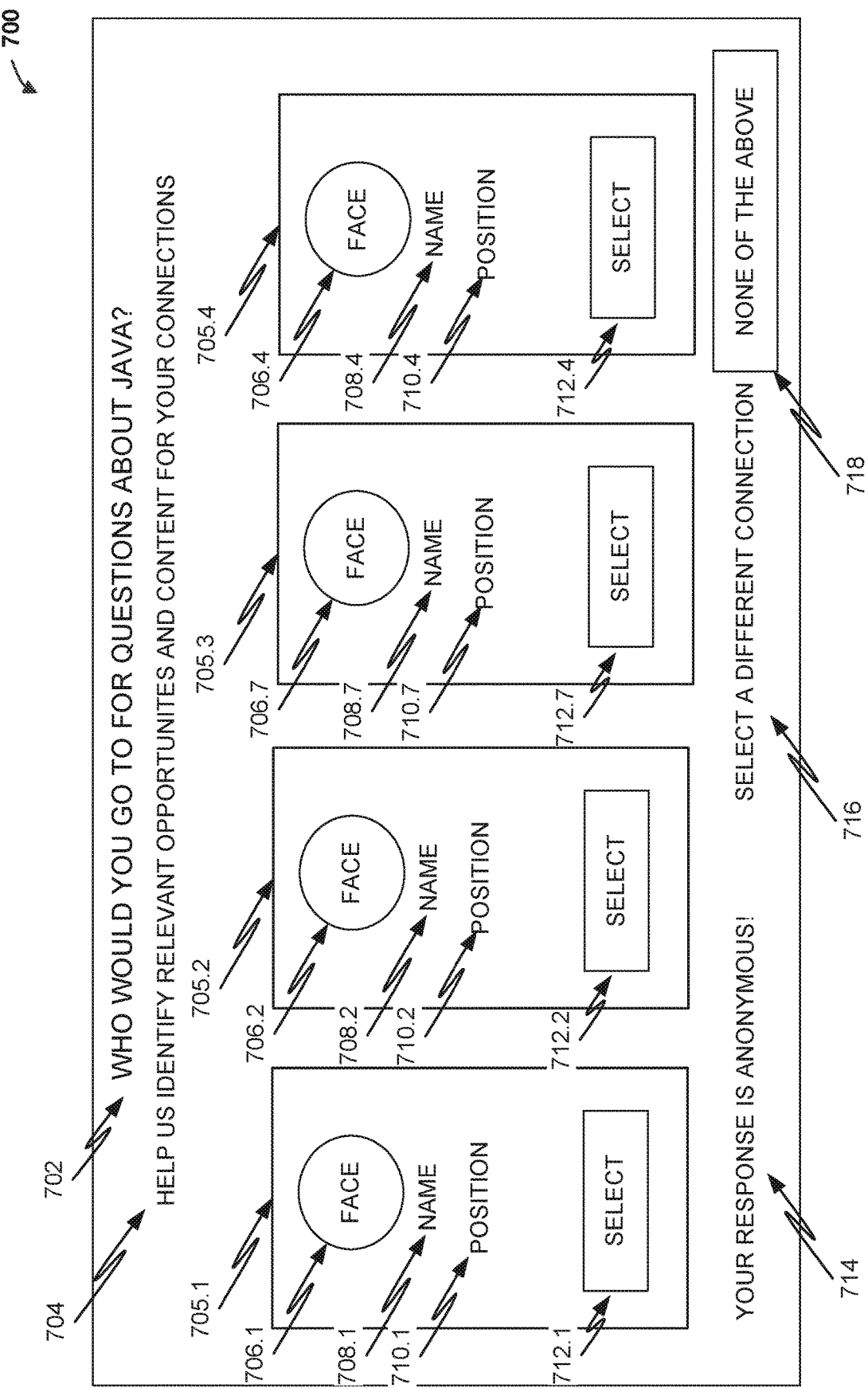
FIG. 7 illustrates a go-to connection UI, in accordance with some embodiments.
Figure 8:
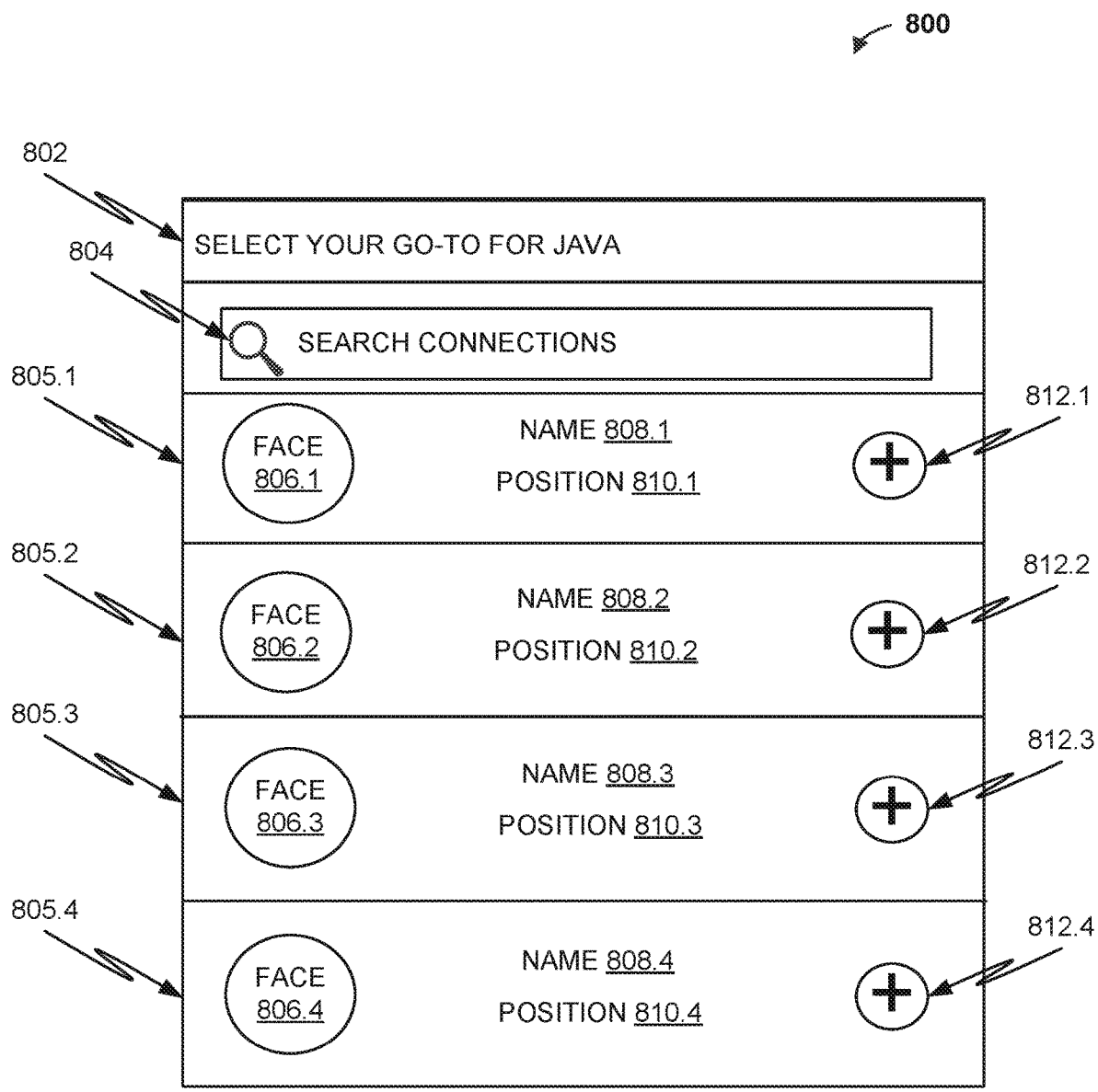
FIG. 8 illustrates a go-to connection UI, in accordance with some embodiments.
Figure 12:
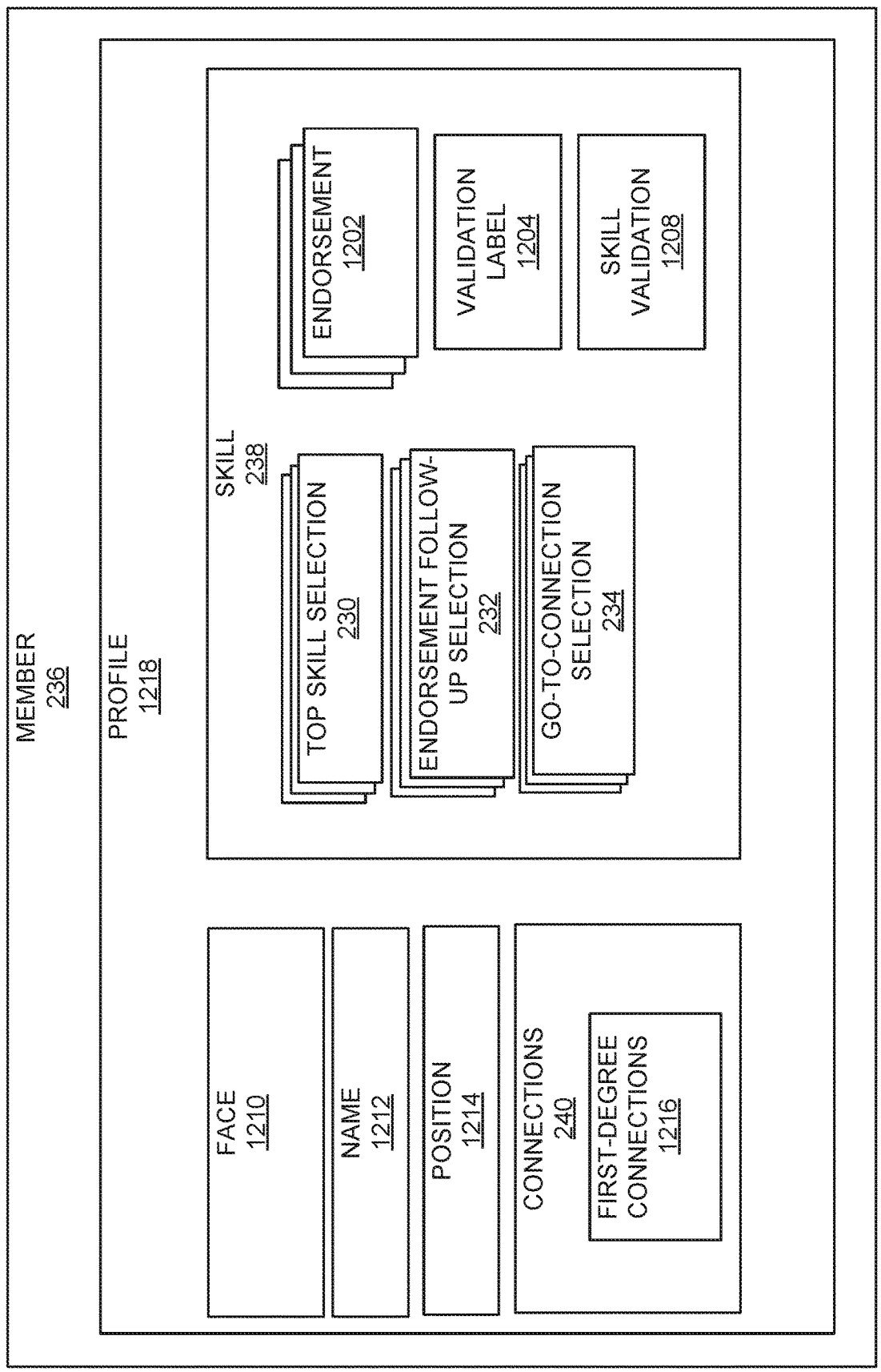
FIG. 12 illustrates a member, in accordance with some embodiments.

FIG. 7 illustrates a go-to connection UI 700, in accordance with some embodiments. Illustrated in FIG. 7 is question 702, request 704, selected members 705, face 706, name 708, position 710, select button 712, privacy message 714, different selection member button 716, and none of the above button 718. The go-to connection UI 700 is based on a skill verification UI 202 for a selected member 206, selected skill 204, selected endorsement 208, and viewer 212. Question 702 may be the question being asked of the viewer 210, which includes the selected skill 204, e.g., as illustrated "JAVA". Request 704 may be text to try to solicit a response from the viewer 212. Selected members 705 may be the same or similar as selected members 206. The face 706 is the face of the selected member 705, e.g., the member 236 with name 708. The name 708 is the name of the selected member 705, e.g., name 1212 (FIG. 12). The position 710 is the position of the selected member 705, e.g., position 1216 (FIG. 12). Select button 712 is a button to select the corresponding selected member 705. Privacy message 714 is a message regarding the privacy of the selection by the view 212. The different selection member button 716 enables the viewer 212 to select a different member 236 other than the selected members 705, e.g., as illustrated in FIG. 8. None of the above button 718 enables the viewer 212 to not make a selection. In some embodiments, the selected member 705 (or choices) offered to the viewer 212 are referred to as position 0 through 3 (e.g., 705.1 is position 0, 705.2 is position 1, etc.) In some embodiments, selected member 705.1 is member 236 whose profile the viewer 212 is viewing. The other selected members 705.2 though 705.4 may be first-degree connections 1214 (FIG. 12) of the selected member 705.1. In some embodiments a different number of selected members 705 is used.

FIG. 8 illustrates a go-to connection UI 800, in accordance with some embodiments. Illustrated in FIG. 8 is question 802, search 804, selected members 805, face 806, name 808, position 810, and more information button 812. The go-to connection UI 800 may be reached by the viewer 212 by selecting different selection member button 716 of FIG. 7. Question 802 may be the same or similar as question 702. Search 804 enables the viewer 212 to search for a different member 236. Selected members 805 may be the same or similar as selected members 705. Face 806 may be the same or similar as face 706. Name 808 may be the same or similar as name 708. Position 810 may be the same or similar as position 710. More information button 812 may provide additional information about the corresponding selected member 805. The viewer 212 may select a selected member 805 by hovering the mouse over the selected member 805 and pressing select.

Figure 9:
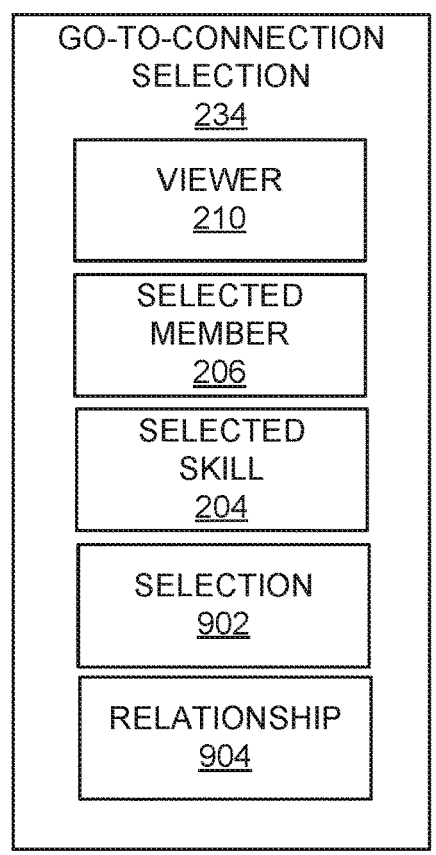
FIG. 9 illustrates a go-to-connection selection, in accordance with some embodiments.

FIG. 9 illustrates a go-to-connection selection 234, in accordance with some embodiments. Illustrated in FIG. 9 is go-to-connection selection 234, viewer 210, selected member 206, selected skill 204, selection 902, and relationship 904. Go-to-connection selection 234 may be the data that is stored as a result of a go-to-connection HI 700, 800, being presented to a viewer 212. The viewer 212 may be the same or similar as viewer 212 of FIG. 2. The selected member 206 may be the same or similar as selected member 206 of FIG. 2. The selected skill 204 may be the same or similar as selected skill 204 of FIG. 2. Selection 902 may be the selection that the viewer 212 made, e.g., selected member 705, 805. Relationship 904 may be a selected relationship (not illustrated in go-to-connection UIs 700, 800 ).

Figure 10:
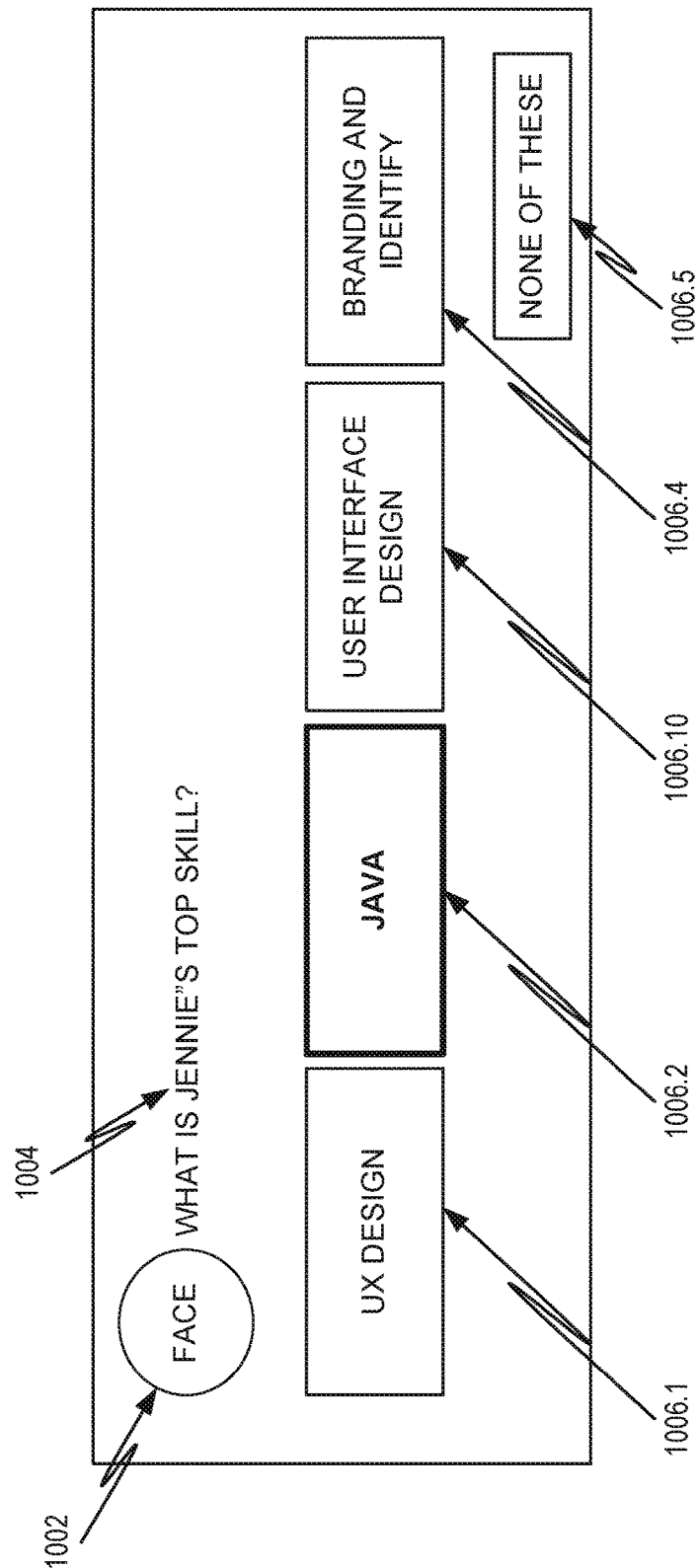
FIG. 10 illustrates a top skill UI, in accordance with some embodiments.

FIG. 10 illustrates a top skill UI 1000, in accordance with some embodiments. Illustrated in FIG. 10 is face 1002, request 1004, and selection options 1006. The top skill UI 1000 is based on a skill verification UI 202 for a selected member 206, selected skill 204, selected endorsement 208, and viewer 212. The face 1002 may be the same or similar as face 1210, e.g., the face 1210 of selected member 206, which as illustrated has a name 1212 of "Jennie." The request 1004 may be text that provides context for the top skill UI 1000 and the question that the viewer 212 is requested to answer. The selection options 1006 are one or more selected skills 204 that the viewer 212 may select. One of the selection options 1006 includes a "None of these" option for the viewer 212. As illustrated in FIG. 10, selection option 1006.2 is selected by the viewer 212. When a selection option 1006 is selected by the viewer 212 a top skill selection 1100 is generated by the system 200. In some embodiments, top skill UI 1000 includes an option for the viewer 212 to select a skill as a top skill of the selected member. In some embodiments, top skill UI 1000 includes an option for the viewer 212 to cancel top skill UI 1000. In some embodiments, the top skill UT 1000 offers the option for the viewer 212 to indicate a relationship between the viewer 212 and the selected member 206. In some embodiments a different number of selected skills 204 is used.

Figure 11:
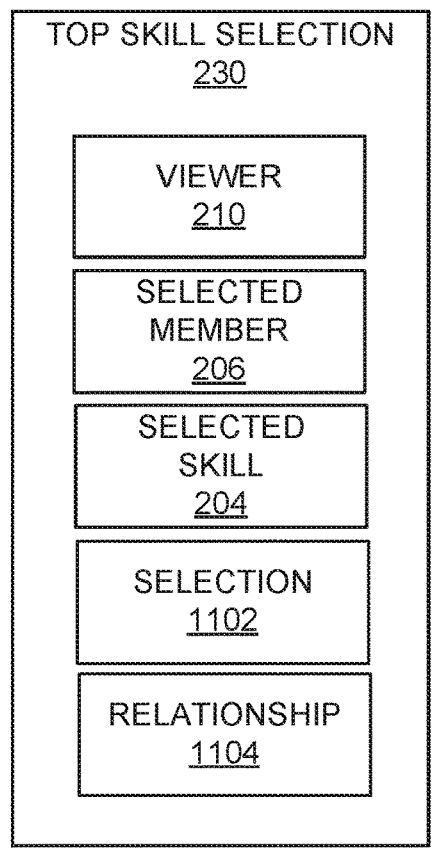
FIG. 11 illustrates a top skill selection, in accordance with some embodiments.

FIG. 11 illustrates a top skill selection 230, in accordance with some embodiments. Illustrated in FIG. 11 is top skill selection 230, viewer 210, selected member 206, selected skill 204, selection 1102, and relationship 1104. Top skill selection 230 may be the data that is stored as a result of a top skill UI 1000 being presented to a viewer 212 with the viewer 212 selecting a selection option 1006 that is stored in selection 1102. The viewer 212 may be the same or similar as viewer 212 of FIG. 2. The selected member 206 may be the same or similar as selected member 206 of FIG. 2. The selected skill 204 may be the same or similar as selected skill 204 of FIG. 2. Selection 1102 may be the selection that the viewer 212 made, e.g., one of the selected skills 204 or none of the above. Relationship 1104 may be a selected relationship between the viewer 212 and the selected member 206 (not illustrated in top skill UT 1000).

FIG. 12 illustrates a member 236, in accordance with some embodiments. Illustrated in FIG. 12 is endorsement 1202, validation label 1204, skill validation 1208, face 1210, name 1212, position 1214, connections 240, first-degree connections 1216, profile 1218, top skill selection 230, endorsement follow-up selection 232, and go-to-connection selection 234.

Validation label 1204 is a binary label that indicates whether the expertise of skill 238 of member 236 is validated, e.g., the member 238 indicated they had skill 238 and skill validation predication module 222 indicted the skill 238 is validated. In some embodiments, the validation label 1204 is assigned a 0 or a 1 based on whether the value of skill validation 1208 is above or below a threshold. Skill validation 1208 may be a value that indicates a skill level or expertise level of member 236 for skill 238. In some embodiments, skill validation 1208 and/or validation label 1204 may be a category or may include thresholds for indicating categories. For example, the categories may be below average, average, or above average. Validation label 1204 and skill validation 1208 may not be visible or accessible to the member 236.

The profile 1218 may be stored in profile data 116. The profile 1218 or a portion of the profile 1218 may be data that is accessible by other members 236 to view. Face 1210 may be an image of a face of the member 236. Name 1212 may be a text name of the member 236. Position 1214 may be a text description of a position the member 236 hold. Connections 240 may be connections with other members 236. First-degree connections 1216 are connections 240 where the member 236 is directly connected to another member 236. A second-degree connection (not illustrated) is a connection where the member 236 is connected to another member 236 through one other connected member 236. And so forth. The profile 1218 may include many other fields such as job, seniority, home address, education, hobbies, etc.

Figure 13:
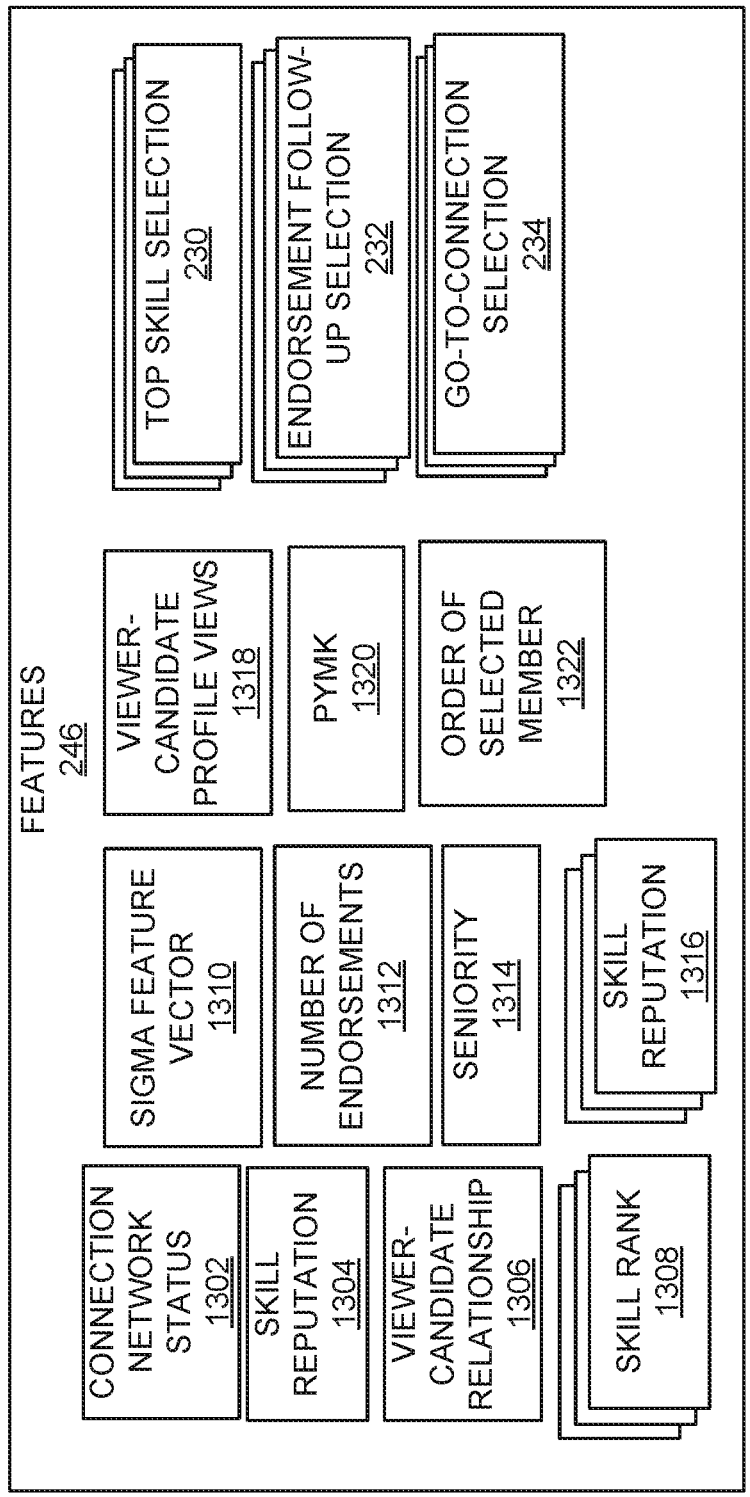
FIG. 13 illustrates features, in accordance with some embodiments.

FIG. 13 illustrates features 246, in accordance with some embodiments. The features 246 may be determined by feature determiner module 244 (FIG. 2). In some embodiments, the features 246 include connection network status 1302, skill reputation 1304, viewer-candidate relationship 1306, skill rank 1308, sigma feature vector 1310, number of endorsements 1312, seniority 1314, skill reputation 1316, viewer-candidate profile views 1318, people you may know (PYMK) 1320, order of selected member 1322, top skill selection 230, endorsement follow-up selection 232, and go-to-connection selection 234.

Skill rank 1308 is a ranking of the difficulty of the skills 238 that have been defined. in the online connection network system 100. Each skill 238 has a corresponding skill rank 1308, which indicates a relative expertise of a skill 238 compared to other skills 238 that are included in the online connection network system 100. Feature determiner module 244 is configured to calculate sigma feature vector 1310. For each member 236 a sigma feature vector 1310 may be generated as follows.

$$\phi_{ij}^{sig}(W) = w_{ij}. \quad \text{Equation (1)}$$

$$\phi_{ij}^{cnt}(W) = \text{count}(w_{ij}). \quad \text{Equation (2)}$$

$$\phi_{ij}^{sig\_lab}(W) = \mathbb{1}\{w_{ij} \neq \emptyset\}. \quad \text{Equation (3)}$$

$$\phi_{ij}^{cnt\_lab}(W) = \mathbb{1}\{\text{count}(w_{ij}) > 1\}. \quad \text{Equation (4)}$$

$$\phi_{ijl}^{corr}(W) = \mathbb{1}\{w_{ij} = w_{il}\}, j, l < k, j \neq l. \quad \text{Equation (5)}$$

$$\phi_{ij}^{maj\_vote}(W) = \text{majority\_vote}(w_{i0}, w_{i1}, \ldots, w_{ik}). \quad \text{Equation (6)}$$

For each member 236 and skill 238, feature determiner module 244 determines the signal matrix $W = \{w\_0, w\_1, \ldots, w\_k\}$ where $w\_j = \{w\_0j, w\_1j, \ldots, w\_nj\}$. $W\_ij$ is the signal. for the ith skill from jth voter, k is the number of signals and voters, and n is the number of skills 238. Equation (2) determines the count(w), which returns the number of votes for voter w. Equations (3) and (4) are propensity features to compensate for the missing and strength of the votes. To model the statistical dependencies between the voters, Equation (5) is determined. Equation (6) determines accounts for the overall trend of the voters where majority_vote $(w\_0, w\_1, \ldots, w\_k)$ that determines a simple majority of the k voters.

Feature determiner module 244 is configured to calculate number of endorsements 1312 for member 236 and skill 238 pairs. Feature determine module 244 is configured to determine connection network status 1302. Connection network status 1302 may include a number of endorsements (D) that may be determined by Equation (7) and a number of profile views (R) that may be determined by Equation (8).

Equation (7): $D_C = \Sigma_{v \in M, v \neq c}^n \Sigma_{s \in S} \text{is\_endorse}(v, c, s)$, $c \in M$. Where D is a number of endorsements, v is viewer 212, c is selected member 206, s is selected skill 204, and M is the set of all members 236.

Equation (8): $R_C = \Sigma_{v \in M, v \neq c}^n \Sigma_{t \in [t_s, t_e]}$ is profile view (v, c, t), $c \in M$. Where R is a number of endorsements, is_profile_view is an indicator function that returns whether v visits c's profile page at time t, t_s is the start point of an aggregated time, and t_e is an end point of an aggregated time. The feature determine module 244 may determine a single value for connection network status 1302.

Feature determiner module 244 is configured to determine seniority 1314 for members 236. The seniority 1314 may be a value from 0 to 10 with 10 being the most senior position 1216, e.g., chief executive officer (CEO), founder, president, etc., and 0 indicating there is no determination of the seniority 1314.

Feature determiner module 244 is configured to determine skill reputation 1316. Skill reputation 1316 may be for each member 236 and skill 238 pair. Skill reputation 1316 is an expertise score for both skills 238 that members 236 list in their profiles as well as skills 238 the members potentially possess. For example, a skill 238 may not be listed in a profile 1218, but the skill 238 may have been listed as required in a job posting for a job the member 236 was hired for. The skill 238 may be added to the profile 1218 of the member 236 based on the member 236 being hired for the job. In another example, a skill 238 may be required for a position 1214 the member 236 holds. The skill reputation 1316 may be used as an estimation of a skill expertise of a member 236.

Feature determiner module 244 is configured to determine viewer-candidate relationship 1306. Viewer-candidate relationship 1306 is determined based on the connections 240 of the viewer 212 and the connections 240 of the selected member 206. Viewer-candidate relationship 1306 may be weighted on first-degree connections 1214 between the viewer 212 and the selected member 206.

Feature determiner module 244 is configured to determine viewer-candidate profile views 1318 based on equation (9). Equation (9): $P_{vc}^* = \Sigma_{t \in [t_s, t_e]}$ is-profile-view (v, c, t), v∈M, c∈M. Where v is viewer 212, c is selected member 206, and t is time with t_s being the start of an interval of time and t_e being the end of an interval of time.

Feature determiner module 244 is configured to determine viewer-candidate profiles views 1318 using equation (9). Feature determiner module 244 is configured to determine PYMK 1320 based on a closeness of two members 236. The closeness may be determined based on connections 240 and comparing the profiles 1218, e.g., attended the same schools, worked at the same positions 1214, etc. The PYMK 1320 may be a score between 0 and 1. Feature determiner module 244 is configured to determine order of selected member 1322. The order of the selected member 1322 may be the order of selected member 706 for go-to-connection UI 700. The first selected member 705.1 (FIG. 7) may be a member 326 whose profile is being viewed by the viewer 212. For example, when to display 210 (FIG. 2) may be that the go-to-connection UI 700 is to be presented to the viewer 212 for a selected member 206 when the viewer 212 views the profile 1218 of the selected member 206. There may be position bias where a position 0 is more likely to be selected. Top skill selection 230, endorsement follow-up selection 232, and go-to-connection selection 234 may be the same or similar as disclosed in conjunction with FIG. 2 and herein. The features 246 may be used to train one or more machine learning models, es., determine viewer module 218, machine learning model 226, etc.

Figure 14:
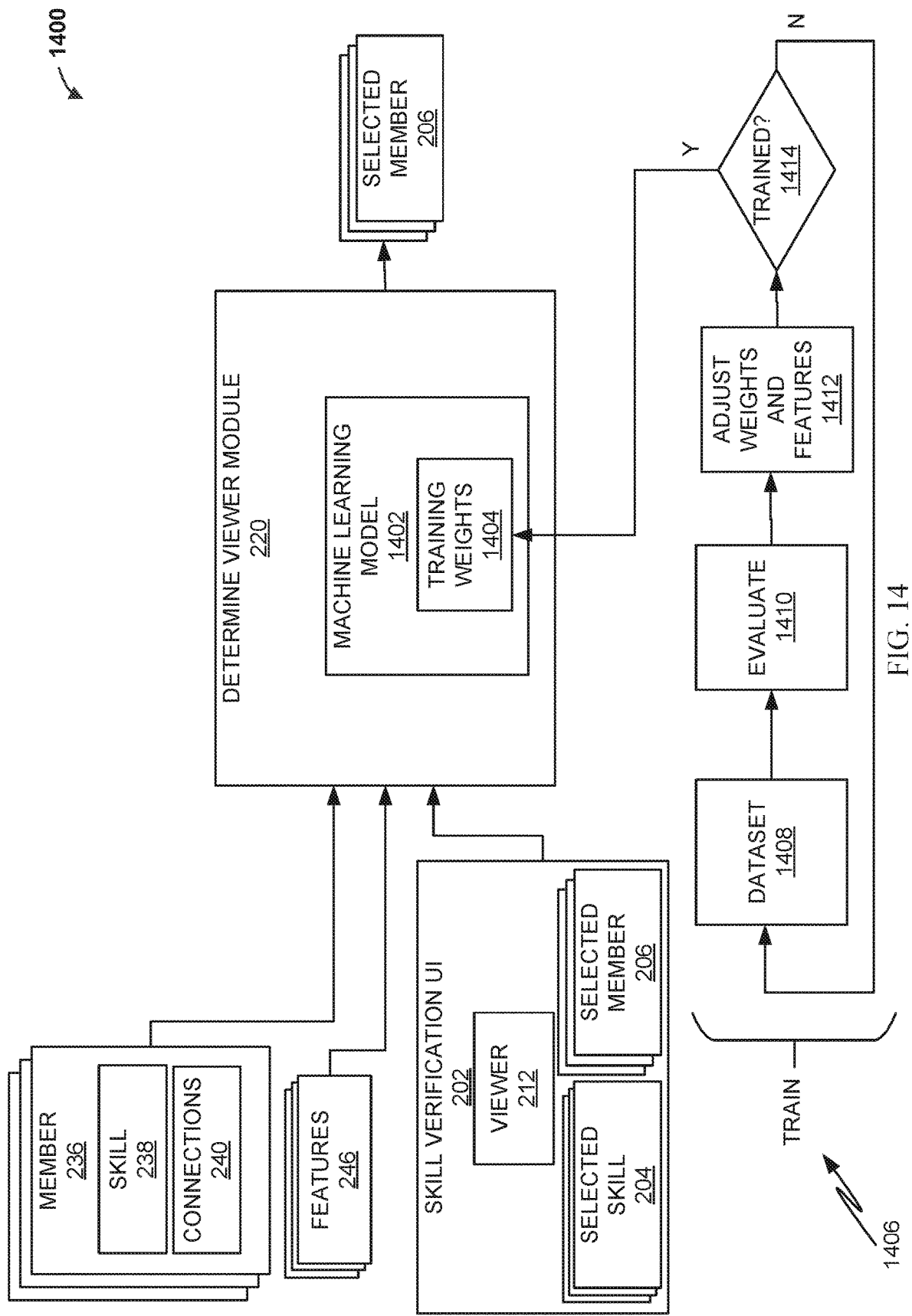
FIG. 14 illustrates determine viewer module, in accordance with some embodiments.

FIG. 14 illustrates determine viewer module 218, in accordance with some embodiments. Determine viewer module 220 may be the same or similar as determine viewer module 220 of FIG. 2. Illustrated in FIG. 14 is member 236, features 246, skill verification UI 202, determine viewer module 218, selected member 206, train 1406, dataset 1408, evaluate 1410, adjust weights and features 1412, and trained 1414.

Table 1 illustrates response rates of validation datasets, in accordance with some embodiments. The social validation datasets include top skill selection 230, endorsement follow-up selection 232, and go-to-connection selection 234. The response rate indicates whether the viewer 212 responded with a rating selection 602, selection 902, or selection 1102 when presented the skill verification UI 202. Illustrates in Table 1 is validation datasets in one column and response rate in another column. Endorsement follow up UI 300, 400, had a response rate of 100%. Go-to-connection UI 700 had a response rate of 41.4%. Top skill UI 1000 had a response rate of 68.5.

TABLE 1

Response Rates of Validation Datasets

| Validation Datasets | Response Rate |
| --- | --- |
| Endorsement Follow up | 100% |
| Go-to-connection | 41.4% |
| Top Skill | 68.5% |

To increase the response rates machine learning models 1402 are used for determine viewer module 220. Equation (10) indicates the goal of determine viewer module 218 for go-to-connection UIs 700, 800. The goal is to pick the selected members 206 to maximize the response rate. Determine viewer module 220 may improve the probability of selected members 206 being selected by the viewer 212 and thus improve the response rate of go-to-connection UIs 700, 800.

Equation (10): candidate=argmax÷candiate Probability (expert=candiate|candiate, viewer, skill), for candiate ∈ C, where candidate is a selected member 206, expert is the selection 902 (FIG, 9 ) of the selected members 206 that is the go-to-connection for viewer 212 and skill is the selected skill 204 of go-to-connection UI 700, 800. Equation (10) says to pick the candidate that has the highest probability of being selected as the expert given a tuple of candidate, viewer, and skill.

The features 246 include connection network status 1302, skill reputation 1304, view-candidate relationship 1306, and skill rank 1308. The machine learning model 1402 may be linear logistic regression model and/or non-linear gradient boosted tree model. In logistic regression, for each feature 246, one indicator is added to indicate the existence of the feature 246.

Trained 1414 may use as a baseline a random selection of tuples of viewer 212, selected skill 204, and a selected member 206, with the tuples assigned a random score, y_sub_r, between 0 and 1 representing the probability that the selected member 206 will be selected as the go-to-connection 705 (FIG. 7) from the go-to-connection UI 700.

The dataset 1408 may be the results of providing the go-to-connection UI 700 to viewers 212 when the viewer 212 views the profile of a selected member 206. In some embodiments, for training, go-to-connection selection 234 is not included in the dataset 1408 when the viewer 212 selects the selected member 206 for whom the profile is being viewed. The dataset 1408 may include the golden dataset 216, in accordance with some embodiments.

Evaluate 1410 may be performed to determine the effectiveness of the machine learning model 1402. The evaluation may be based on determining area under the curve (AUC), which measures the probability of ranking a random positive sample ahead of a negative sample. Evaluation 1410 may be configured to use the golden dataset 216 to present go-to-connection UI 700 with known skill levels for the selected skill 204 of the selected members 206. Then average precision (AP)@1 can be calculated using equation (11), which is an indicator whether the viewer 212 selects the selected member 705 of the selected members 705 that has the highest skill level (based on the golden dataset 216 ) for the selected skill 204. The highest skill level for the selected skill 204 of the selected members 206 is determined from the golden dataset 216.

$$AP@K = \frac{\sum_{i=1}^{K} P@i}{K}.$$ Equation (11)

Where P is precision and K is the cut-off rank of the top most results when calculating AP. In this case, K=1. From equation (11), the mean average precision (MAP) can be determined using equation (12).

$$MAP = \frac{\sum_{i=1}^{Q} AP(q)}{Q}.$$ Equation (12)

Where Q is the number of presentations of the go-to-connection UI 700 and P@i is whether for the ith presentation of the go-to-connection UI 700 the viewer 212 chose the selected member 705 with the highest skill level for the selected skill 204 (determined from the golden dataset 216 ). Equation (10) may be used to evaluate 1410 the effectiveness of the machine learning model 1402 and determine whether to adjust training weights 1404 by the adjust weights and features module 1412. Additionally, equation (10) may be used to determine whether to continue to train the machine learning model 1402 at trained 1414. Equations (10), (11), and (12) may also be used during a verification and testing phase (not illustrated) of training 1406.

Table 2 illustrates A/B Test of Go-To-Connection UI compared to baseline. The A/B test is performed by splitting the members 236 into two groups with a 50/50 ratio. The test group served by our machine learning model 1402 has a 4.0% (Row 1) increase in number of selected members 206 selected from the go-to-connection UI 700 by viewer 212, while a 39.0% (Row 2) decrease in the number of viewers 212 skipping go-to-connection UI 700.

Additionally, there is a +6.5% (Row 3) increase in a viewer 212 selecting the expert (a selected member 206 ) for the first time. There is a −23.1% (Row 4) decrease in user selection of a different skill expert than before.

TABLE 2

| illustrates A/B Test of Go-To-Connection UI compared to baseline. | | |
|---|---|---|
| Row | Number of | Change |
| 1 | Users selecting from Go-To-Connection UI 700 | +4.0% |
| 2 | Users skipping the Go-To-Connection UI 700 | −39% |
| 3 | User selection of a skill expert for the first time | +6.5% |
| 4 | User selection of a different skill expert than before | −23.1% |

When a viewer 212 is presented with go-to-connection UI 700, all possible members 236, e.g., members 236 that have a first-degree connection 1216 with the viewer 212, are scored using determine viewer module 218, in accordance with some embodiments. The members 236 are ranked based on the machine learning model 1402, which may generate a score for each of the members 236. The top three members 236 become the selected members 206 with the member 236 whose profile 1218 the viewer 212 is viewing.

In some embodiments, the selection of the selected member 206 whose profile 1218 was being viewed by the viewer 212 is discounted to remove the bias of the first-place position or position 0 being more likely to be selected. The performance of the system 200 is improved by using determine viewer module 218 to select the selected members 206 (members 705 ) to display on the go-to-connection UI 700.

Figure 15:
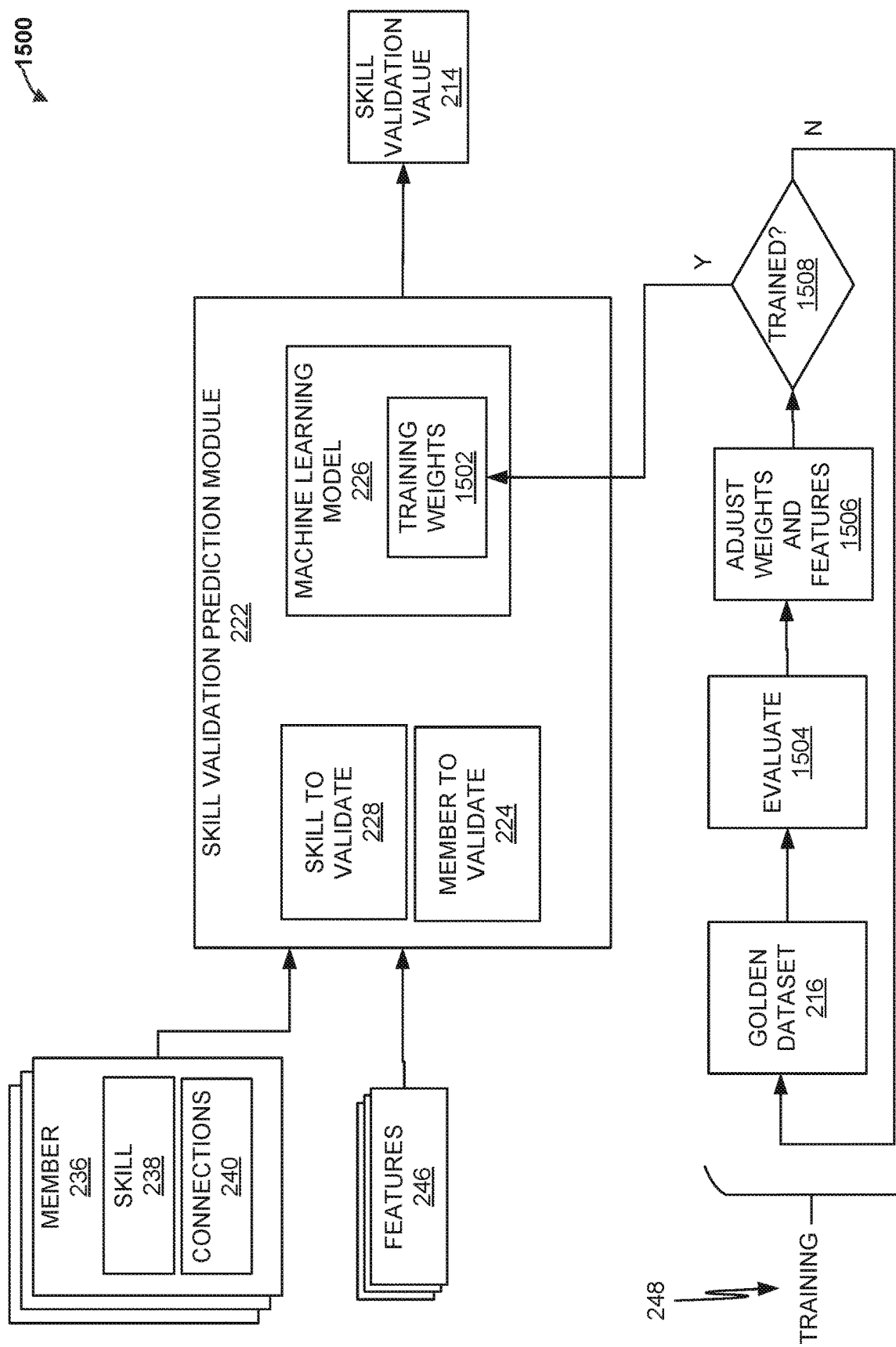
FIG. 15 illustrates skill validation prediction module, in accordance with some embodiments.

FIG. 15 illustrates skill validation prediction module 222, in accordance with some embodiments. Illustrated in FIG. 15 is member 236, skill 238, connections 240, features 246, skill validation prediction module 222, skill to validate 228, member to validate 224, machine learning model 226, training weights 1502, train 248, golden dataset 216, evaluate 1504, adjust weights and features 1506, trained 1508, and skill validation value 214.

The features 246 may include one or more of the features 246 disclosed in conjunction with FIG. 13. The features 246 may include the sigma feature vector 1310 and number of endorsements 1312. Skill validation prediction module 222 may normalize the number of endorsements 1312 to a value between 0 and 1 for use as a feature 246.

Machine learning model 226 may incorporate each of the features 246 by stacking a gradient boosting model on top of a skill reputation model. The machine learning model 226 may include a non-parametric tree model to handle categorical features and unobserved interactions. Skill validation prediction module 222 takes a skill to validate 228 and member to validate 224 and generates a value for skill validation value 214 using the machine learning model 226 and training weights 1502.

Table 3 illustrates different machine learning models 226. Row 1 illustrates a baseline where rules are used to determine the skill validation value 214. Row 2 illustrates logistic regression as the machine learning model 226 where AUC and MAP@1 (Equation 11) improve +26% and +48.5%, respectively. Row 3 illustrates the use of gradient boosting (e.g., XGBoost) for the machine learning model 226 where AUC and MAP@1 (Equation 11) improve +30.8% and 54.5%, respectively.

TABLE 3

| Machine Learning Models | | | |
|---|---|---|---|
| Row | Model | AUC | MAP@1 |
| 1 | Baseline | — | — |
| 2 | Logistic Regression | +26.4% | +48.5% |
| 3 | Gradient Boosting | +30.8% | +54.5% |

Table 4 illustrates skill validation prediction with features. Table 4 illustrates the change in Accuracy and AUC of skill validation values 214 using different features 246 for the machine learning models 226 compared with Row 1. The features 246 indicated in the column are used to train the machine learning model 226 and then the machine learning model 226 is used to determine skill validation value 214 for member to validate 224 and skill to validate 228 pairs. The golden dataset 216 is used to determine the values of Table 4 (and Table 5), e.g., the skill validation values 214 from the golden dataset 216 are compared with skill validation values 214 determined using skill validation prediction model 222 where the machine learning model 226 is trained with the features 246 indicated in the feature column and the skill validation value 214 is determined with the features 246 indicated in the feature column. In some embodiments different machine learning models 226 are used depending on the features 246 used.

Row 1 indicates the feature is skill reputation. Skill reputation may be skill reputation 1304 as disclosed in conjunction with FIG. 13. The machine learning model 1402 may be linear logistic regression model and/or non-linear gradient boosted tree model. In logistic regression, for each feature 246, one indicator is added to indicate the existence of the feature 246.

Rows 2-6 indicates the Accuracy and AUC in comparison to Row 1. Row 2 indicates the feature 246 is endorsement count (e.g., number of endorsements 1312 ). Both the Accuracy and AUC decrease −3.5% and −4.1%, respectively.

Row 3 indicates the features 246 of skill reputation 1304, top skill selection 230, endorsement follow-up selection 232, and go-to-connection 234. The three social signals refer to top skill selection 230, endorsement follow-up selection 232, and go-to-connection 234. Row 3 indicates the Accuracy and AUC improved +7.7% and +10.3%, respectively. Row 4 indicates the features 246 skill reputation 1304, endorsement follow-up selection 232, and top skill selection 230. The Accuracy and AUC improved +5.1% and +7.0%, respectively. Row 5 indicates the features 246 skill reputation 1304, endorsement follow-up selection 232, and go-to-connection 234. The Accuracy and AUC improved +3.4% and +5.4%, respectively. Row 6 indicates the features 246 skill reputation 1304, top skill selection 230, and go-to-connection 234. The Accuracy and AUC improved +4.8% and +7.1%, respectively. The best results from Table 4 are Row 3 where skill reputation 1304, top skill selection 230, endorsement follow-up selection 232, and go-to-connection 234 are all used as features 246 to train the machine learning model 226 and determine skill validation value 214. Rows 4, 5, and 6 illustrate the effect of removing one of top skill selection 230, endorsement follow-up selection 232, and go-to-connection 234. Top skill selection 230 (removal in Row 5) has the most negative affect on the Accuracy and AUC.

TABLE 4

Skill Validation Prediction with Features

| Row | Features | Accuracy | AUC |
|---|---|---|---|
| 1 | Skill Reputation | — | — |
| 2 | Endorsement Count | −3.5% | −4.1% |
| 3 | Skill Reputation + 3 social signals | +7.7% | +10.3% |
| 4 | Skill Reputation + Endorsement Follow-up + Top Skill | +5.1% | +7.0% |
| 5 | Skill Reputation + Endorsement Follow-up + Go-To-Connection | +3.4% | +5.4% |
| 6 | Skill Reputation +Top Skill + Go-To-Connection | +4.8% | +7.1% |

Table 5 illustrates model lift compared to skill reputation, e.g., skill reputation indicates a machine learning model 226 trained with skill reputation 1316. In some embodiments, machine learning model 226 is trained with feature 246 skill reputation 1316 where the skills 238 used to train the machine learning model 226 are programming skills, e.g., C++, JAVA, etc. For Rows 1 and 2, the features 246 of Row 3 of Table 4 were used. In Row 1 the skills 238 used to train the machine learning model 226 were only for programming skills. In Row 2 skills used to train the machine learning model 226 were non-programming skills. The results indicate that using skills 238 that are non-programming skills (Row 2) increases the AUC +9.9. Table 5 indicates that a performance gain is realized when training 248 is performed for skills 238 that are non-programming skills or more general skills 238. In some embodiments, skill validation prediction module 222 may use two machine learning models 226 one for the skills 238 of Row 1 and one for the skills 238 of Row 2.

TABLE 5

Model Lift Compared to Skill Reputation

| Row | Test Group | Accuracy | AUC |
|---|---|---|---|
| 1 | Programming skill | +9.5% | +2.7% |
| 2 | Non-programming skill | +7.4% | +9.9% |

Training 248 may include golden dataset 216, evaluate 1504, adjust weights and features 1506, and trained 1508. In some embodiments, there are additional operations, e.g., the golden dataset 216 may be split into three groups of data, training set, verification set, and test set. After trained 1508 indicates the machine learning model 226 is trained, there may be additional modules that verify that the skill validation values 214 are close enough to the verification dataset of the golden dataset 216. In some embodiments, there are additional operations to perform testing of skill validation prediction module 222 after the verification operations.

Evaluate 1504 may use the golden dataset 216 to evaluate the training weights 1502 and/or machine learning model 226. For example, evaluate 1504 may determine skill validation values 214 for a portion of the golden dataset 216 and compare the skill validation values 214 with the golden dataset 216 skill validation values. Adjust weight and features 1506 may determine to adjust the training weights 1502 or include or exclude one or more features 246. Additionally, adjust weight and features 1506 may determine to switch to a different machine learning model 226 if the evaluation determined by evaluate 1504 is not acceptable. In some embodiments, in a verification or testing phase, the machine learning model 226 may be changed if the results are not acceptable. Additionally, adjust weights and features 1506 may determine that a feature of the features 246 (as disclosed in conjunction with FIG. 13) should be added or dropped from being used for the training 248.

Figure 16:
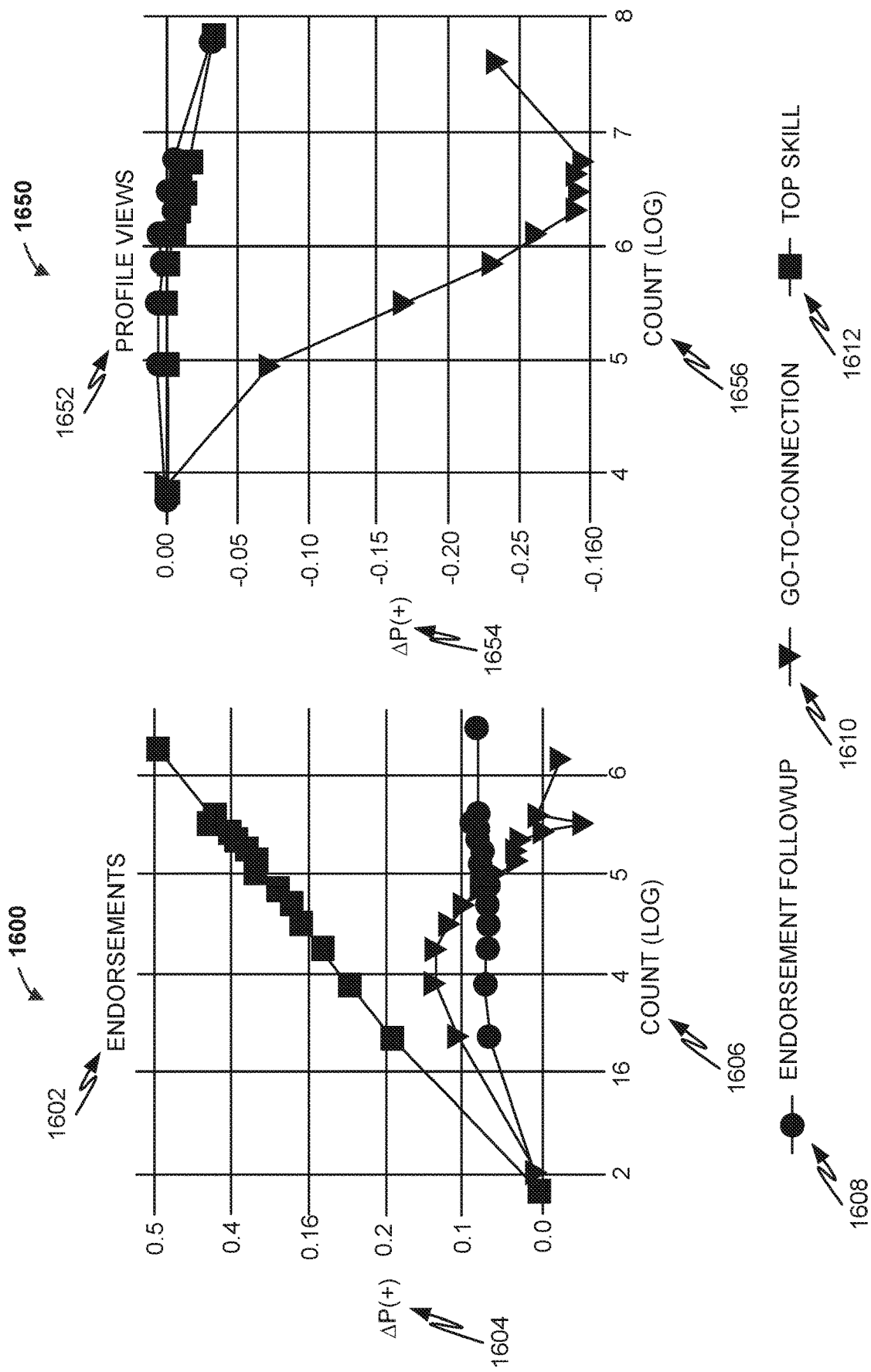
FIG. 16 illustrates endorsements and profile views effect on positive (P) responses, in accordance with some embodiments.

Trained 1508 may determine whether to evaluate 1504 again after the adjust weight and features 1506. If the result of evaluate 1504 is that the training weights 1502 and/or features 246 appear to be providing a good fit with an error below a threshold, then the trained 1508 may determine that the machine learning model 226 is trained. After trained 1508 determines the machine learning model 226 is trained there may be verification and testing operations FIG. 16 illustrates endorsements 1600 and profile views 1652 effect on positive (P) responses, in accordance with some embodiments. Illustrated in FIG. 16 is endorsements 1602, ΔP(+) 1604, count (log) 1606, endorsement follow-up 1608 (data from endorsement follow-up selection 232 ), go-to-connection 1610 (data from go-to-connection selection 234 ), top skill 1612 (data from top skill selection 230), profile views 1652, ΔP(+) 1654, and count (log) 1656. ΔP(+) 1604, 1654 may be a fraction of positive responses in a given set of assessments, e.g., top skill selection 230, endorsement follow-up selection 2 32, and go-to-connection selection 234, as a function of the endorsements 1600 and profile views 1652. Generally, the higher the endorsements 1600, which may indicate connection network status 1302, the higher ΔP(+) 1604. However, for go-to-connection 1610, ΔP(+) 1604 drops off after a count of about 4.2.

ΔP(+) 1654 does not change very much for profile views 1652 for endorsement follow-up 1608 and top skill 1612. Go-to-connection 1610 show a negative correlation between ΔP(+) 1654 and profile views 1652. One possibility is that connection network status 1302 of a member 236 increases with seniority of the member 236.

Figure 17:
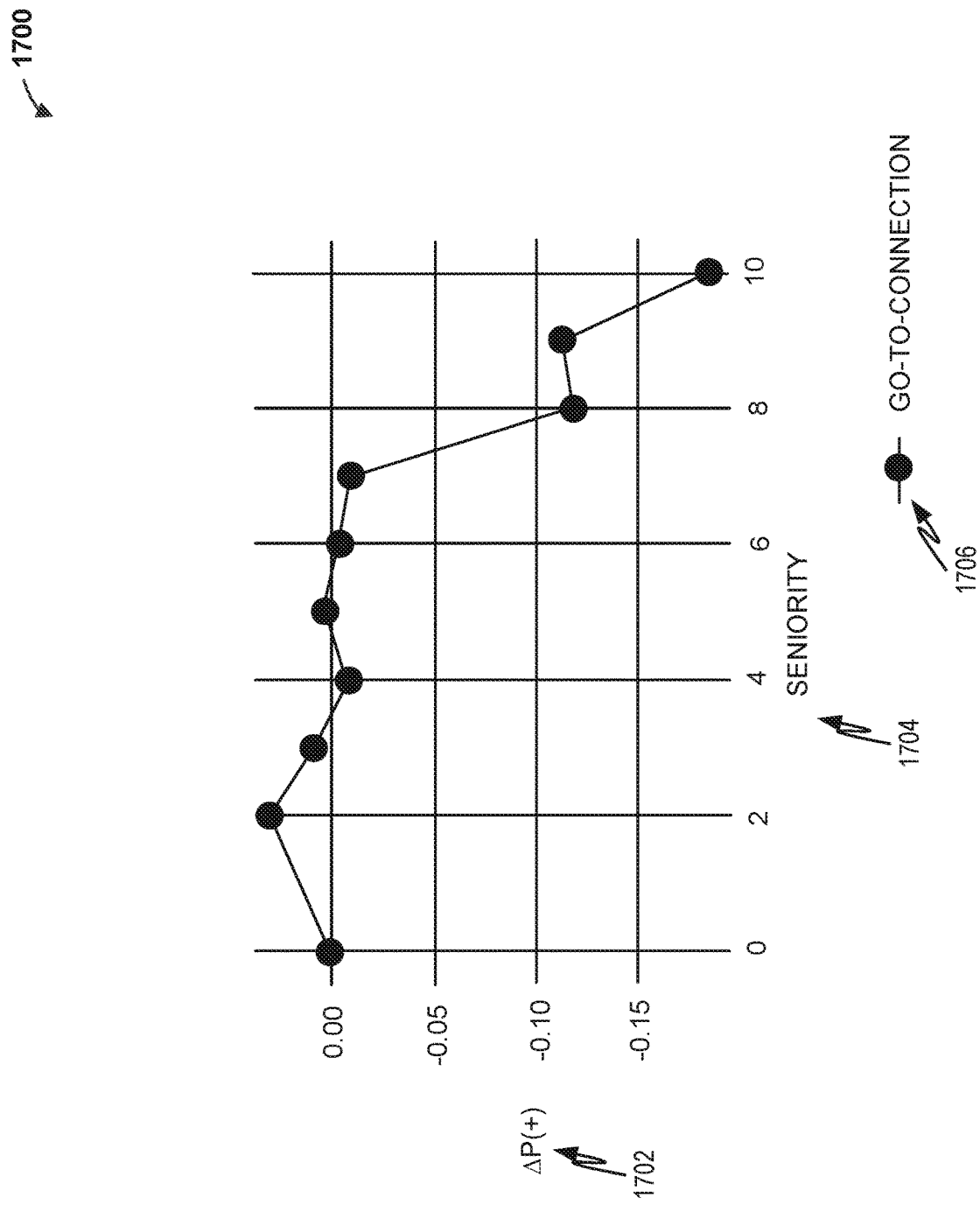
FIG. 17 illustrates seniority effect on P responses, in accordance with some embodiments.

FIG. 17 illustrates seniority 1704 effect on P responses 1700, in accordance with some embodiments. Illustrated in FIG. 17 is ΔP(+) 1702, seniority 1704, and go-to-connection 1706. Seniority 1704 may be feature 246 seniority 1314. Seniority 1704 is negatively correlated with ΔP(+) 1702. Members 236 that are closely related to a member 236 with a high seniority 1704 value may be cautious to select the member 236 with the high seniority 1704 as a go-to-connection. Additionally, members 236 may interpret the go-to-connection UI 1700 as meaning not the one with the best answer, but the one to actually go to get help. Members 236 may not chose members 236 with a high seniority 1704 since members 236 with a high seniority 1704 may not be accessible.

Figure 18:
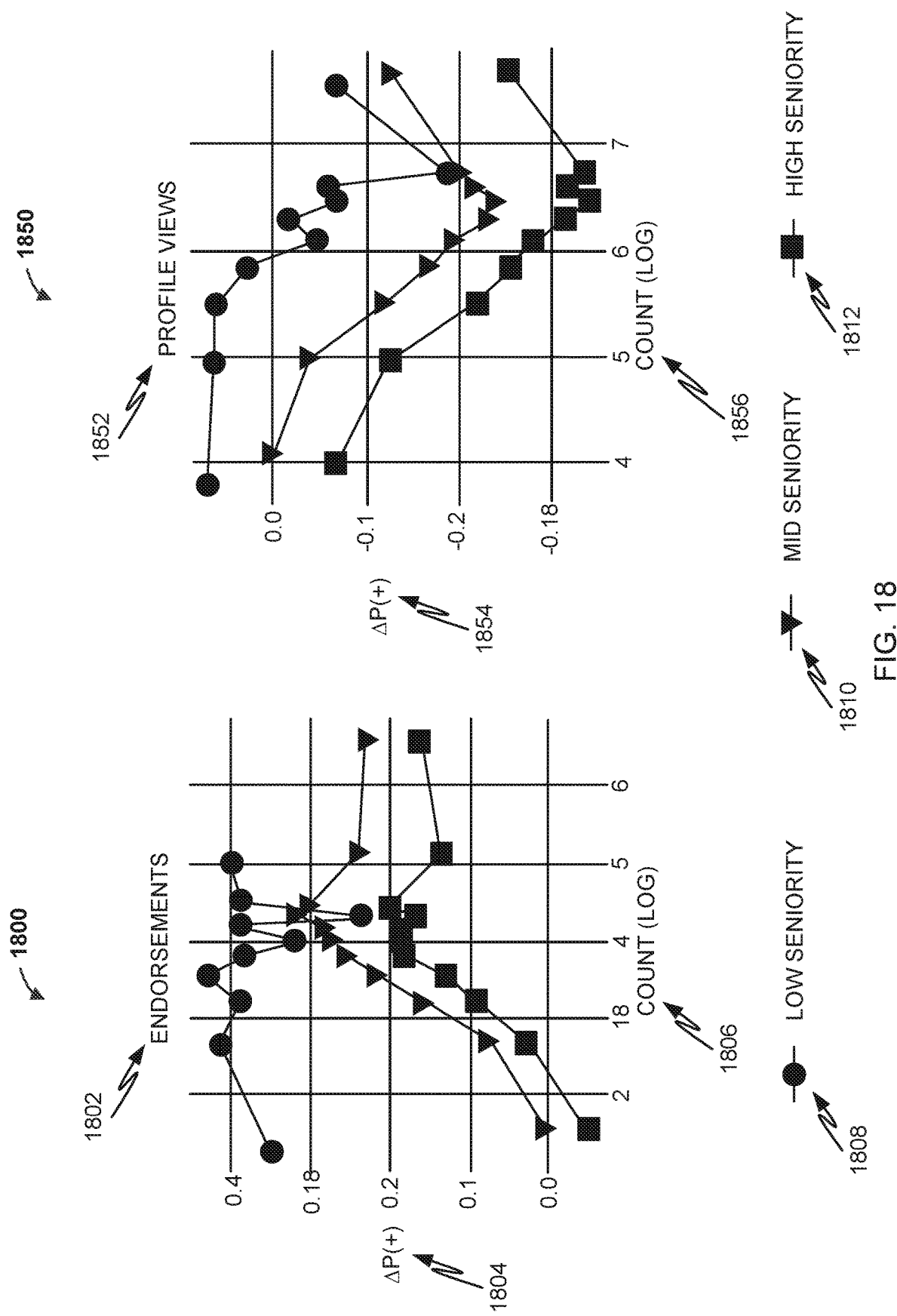
FIG. 18 illustrates endorsements and profile views effect on P responses for go-to-connection, in accordance with some embodiments.

FIG. 18 illustrates endorsements 1800 and profile views 1850 effect on P responses for go-to-connection, in accordance with some embodiments. Illustrated in FIG. 18 is endorsements 1802, ΔP(+) 1804, count (log) 1806, low seniority 1808, mid-level seniority 1810, high-level seniority 1812, profile views 1852, ΔP(+) 1854, and count (log) 1856. The counts are of go-to-connections. The seniority 1314 (feature 246) is categorized into low-level seniority 1808 (e.g., values 0-2), mid-level seniority 1810 (e.g., values 3-7), and high-level seniority 1812 (e.g., values 8-10). Low-level seniority 1808 show no correlation between count (log) 1806 of endorsements 1802 and ΔP(+) 1804. Mid-level seniority 1810 and high-level seniority 1812 increase ΔP(+) 1804 with count (log) 1806 of endorsements 1802. FIG. 6 illustrates that endorsements 1802 may be more significant when the seniority of the members 236 passes a certain threshold.

Figure 19:
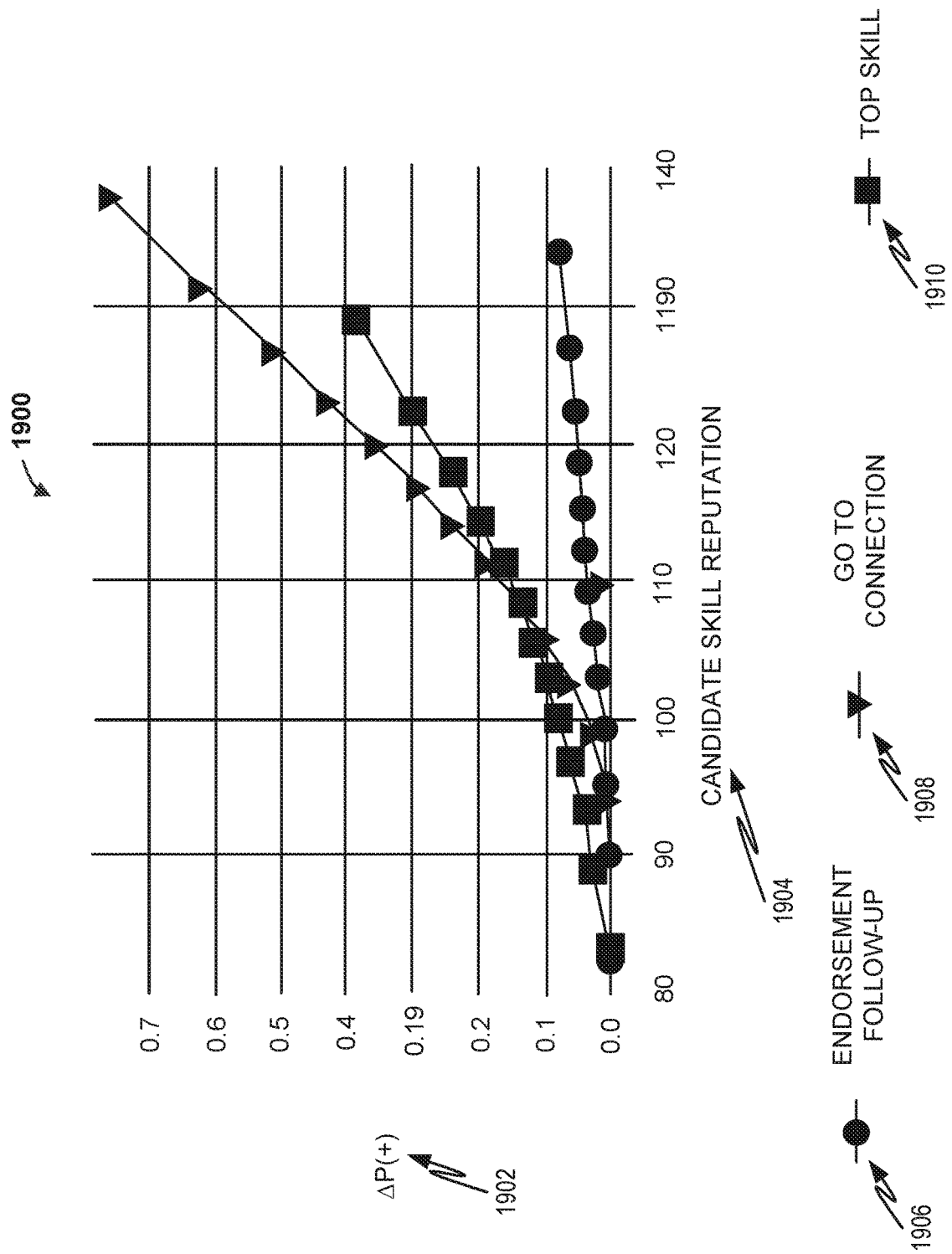
FIG. 19 illustrates candidate skill reputation vs. P responses, in accordance with some embodiments.

FIG. 19 illustrates candidate skill reputation vs. P responses 1900, in accordance with some embodiments. illustrated in FIG. 19 is ΔP(+) 1902, candidate skill reputation 1904, endorsement follow-up 1906 (data from endorsement follow-up selection 232), go-to-connection 1908 (data from go-to-connection selection 234), top skill 1910 (data from top skill selection 230). Candidate skill reputation 1904 may be the same or similar as skill reputation 1316 (FIG. 13). As the candidate skill reputation 1904 increases, the ΔP(+) 1902 increases, which may mean that members 236 with a higher candidate skill reputation 1904 are more highly regarded and thus receive more positive responses (ΔP(+) 1902 increases.) ΔP(+) 1902 does not increase as much for endorsement follow-up 1906 as it does for go-to-connection 1908 and top skill 1910.

Figure 20:
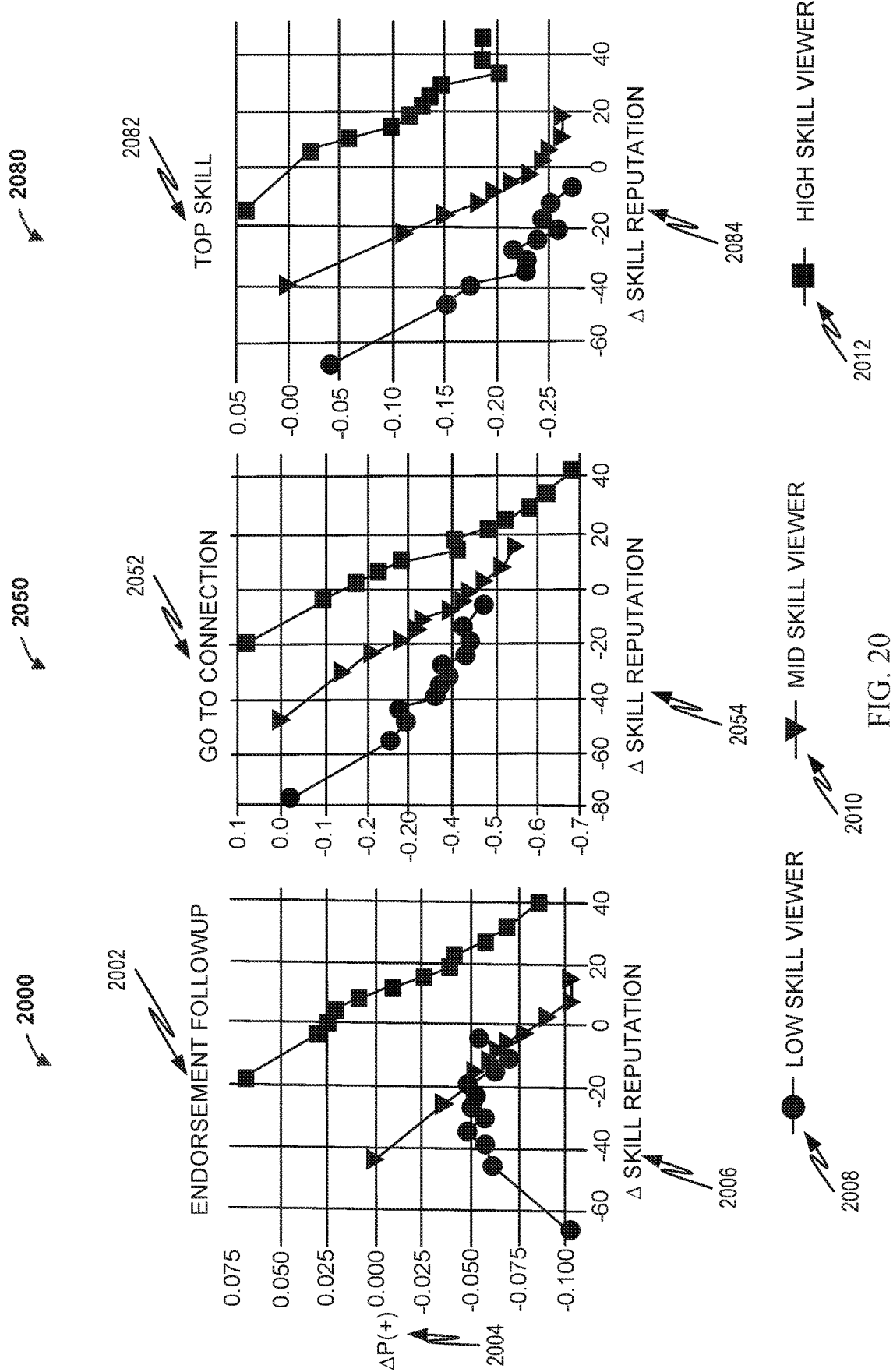
FIG. 20 illustrates change in skill reputation vs. P responses for endorsement follow-up, go-to-connection, and top skill, in accordance with some embodiments.

FIG. 20 illustrates change in skill reputation vs. P responses for endorsement follow-up 2000, go-to-connection 2050, and top skill 2080, in accordance with some embodiments. Illustrated in FIG. 20 is endorsement follow-up 2002, ΔP(+) 2004, Δskill reputation 2006, low-skill viewer 2008, mid-skill viewer 2010, high-skill viewer 2012, go-to-connection 2052, Δskill reputation 2054, top skill 2082, and Δskill reputation 2084. Δskill reputation 2006, 2054, 2084 may be determined based on skill reputation 1316 (FIG. 13).

Endorsement follow-up 2002 is from data from endorsement follow-up selection 232), go-to-connection 2052 is from data from go-to-connection selection 234, and top skill 2080 is from data from top skill selection 230. Δskill reputation 2006, 2054, 2084 indicates a difference in the reputation of the member 236 who is the viewer 212 and the member 236 who is the selected member 206.

Regardless of the viewer 212 skill reputation 1316, in most cases, the delta skill reputation 2006, 2054, 2084 negatively correlates with the ΔP(+) 2004 with the exception of the low skill viewers 2008 of endorsement follow-up 2002. In some embodiments, low skill viewers 2008 are discounted for endorsement follow-ups 2002. At a same level of Δskill reputation 2006, 2054, 2084, high-skill viewers 2012 give a higher ΔP(+) 2004 than mid-skill viewers 2010 or low-skill viewer 2008. In go-to-connection 2052, the sensitivity of viewer response on the Δskill reputation 2006, 2054, 2084 increases with the viewer skill reputation, e.g., the slope change in go-to connection 2052. The difference indicates that high-skill viewers 2012 are more confident and more willing to act on a larger Δskill reputation 2006, 2054, 2084 difference.

Figure 21:
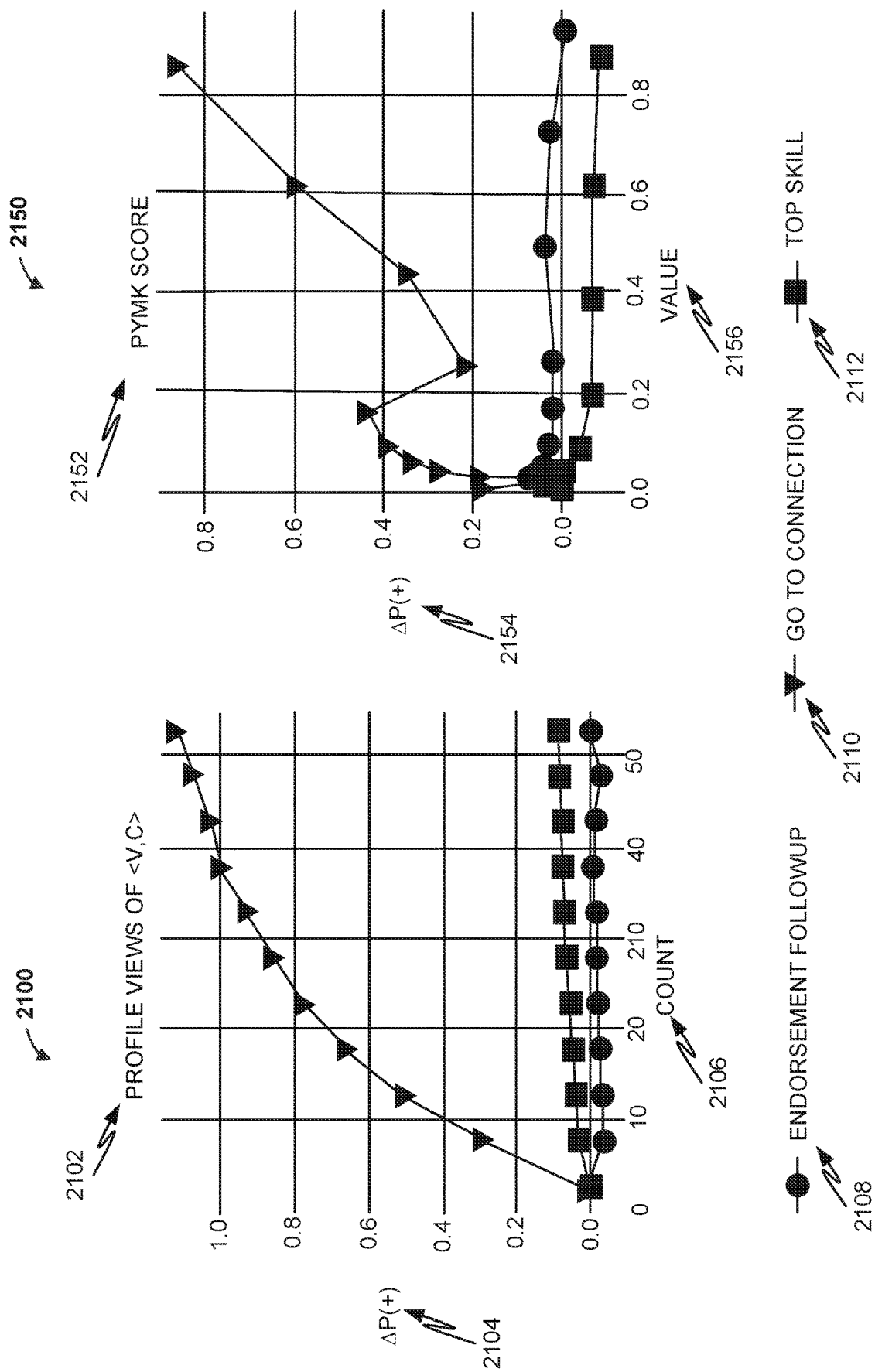
FIG. 21 illustrates profile views and people you may know (PYMK) score vs. P responses, in accordance with some embodiments.

FIG. 21 illustrates profile views 2100 and people you may know (PYMK) score 2150 vs. P responses 2100, 2150, in accordance with some embodiments. Illustrated in FIG. 21 profile views <v,c>2102, ΔP(+) 2104, count 2106, endorsement follow-up 2108, go-to-connection 2110, top skill 2112, PYMK score 2152, ΔP(+) 21.54, and value 2156. Endorsement follow-up 2108 is from data from endorsement follow-up selection 232 ), go-to-connection 2110 is from data from go-to-connection selection 234, and top skill 2112 is from data from top skill selection 230. Profile views <v,c>2102 may be the same or similar as viewer-candidate profile views 1318. PYMK score 2152 may be the same or similar as PYMK 1320. Profile views of <v,c>2102 indicates a number of profile views by the viewer 212 (v) of a selected member 206 (c). There is a strong positive correlation between number of profile views of <v, c>2102 and ΔP(+) 2104 for go-to-connection 2110. There is a strong positive correlation between the value 2156 of the PYMK score 2152 and ΔP(+) 2154 for go-to-connection 2110. There is not a strong positive correlation between number of profile views of <v, c>2102 and ΔP(+) 2104 for endorsement follow-up 2108 and top skill 2112. There is not a strong positive correlation between the value 2156 of the PYMK score 2152 and ΔP(+) 2154 for endorsement follow-up 2108 and top skill 2112. The difference between the strong positive correlation and there not being a strong positive correlation may be that in go-to-connection UI 700 the selected member 206 is not fixed whereas the selected member 206 is fixed for both endorsement follow-up UI 300, 400 and top skill UI 1000.

Figure 22:
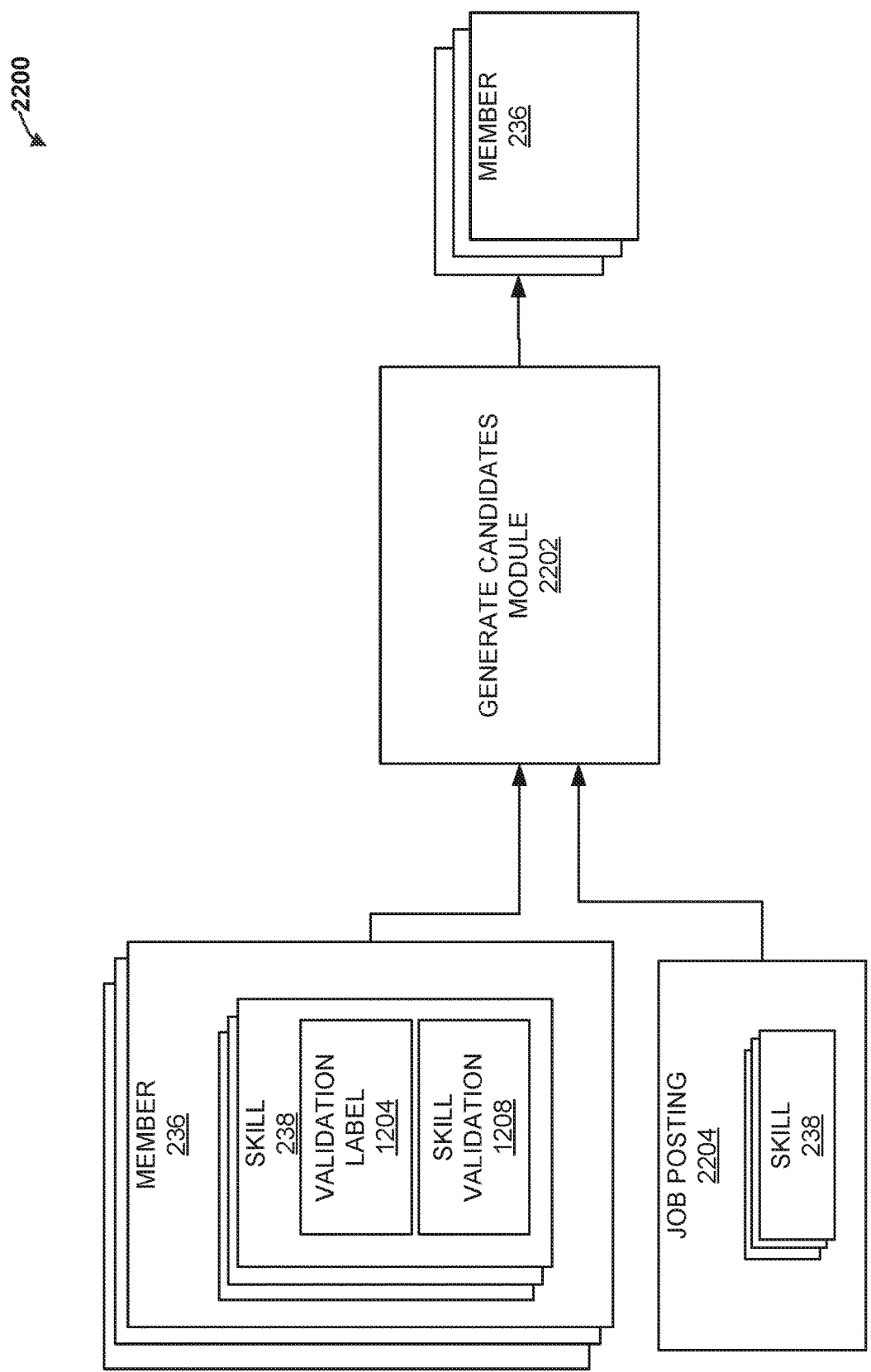
FIG. 22 illustrates generate candidates, in accordance with some embodiments.

FIG. 22 illustrates generate candidates 2200, in accordance with some embodiments. Illustrated in FIG. 22 is member 236, skill 238, validation label 1204, skill validation 1208, job posting 2204, and generate candidates 2202. Generate candidates module 2202 may be invoked by a recruiter or another member 236 of the online connection network system 100 to find members 236 that meet requirements for job postings 2204. Generate candidates 2202 compares the skills 238 of the job posting 2204 to the skills 238 of the members 236 and uses the validation label 1204 and/or the skill validation 1208 to determine whether the member 236 actually has the skill 238 required for the job listed in the job posting 2204. Validation label 1204 and/or skill validation 1208 enable generate candidates module 2202 to generate members 236 that are more likely to have the skills 238 required by the job posting 2204.

Figure 23:
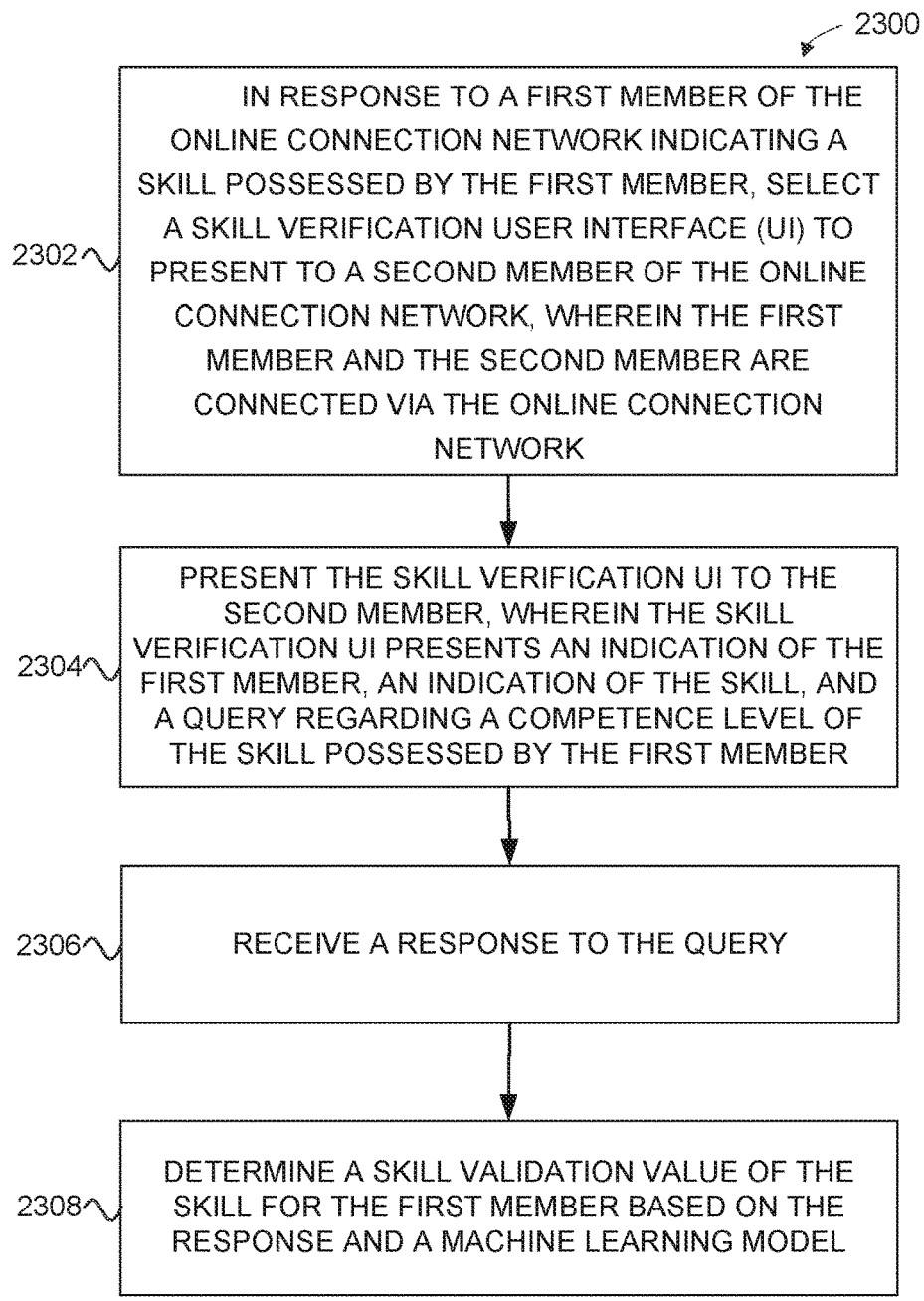
FIG. 23 illustrates a method for skill validation, in accordance with some embodiments.

FIG. 23 illustrates a method 2300 for skill validation, in accordance with some embodiments. The method 2300 begins at operation 2302 with in response to a first member of the online connection network indicating a skill possessed by the first member, selecting a skill verification UI to present to a second member of the online connection network, wherein the first member and the second member are connected via the online connection network. For example, referring to FIG. 7, member 705.1 may have indicated that they have a skill 238 of JAVA. The system 200 may selected a skill verification UI 202 to present to viewer 212.

The method 2300 may continue at operation 2304 with presenting the skill verification UI to the second member, where the skill verification UI presents an indication of the first member, an indication of the skill, and a query regarding a competence level of the skill possessed by the first member. For example, top-skill UI 1000 (FIG. 10) may be presented to viewer 212 for selected member 206, with the query "What is Jenne's top skill?". The method 2300 may continue at operation 2306 with receiving a response to the query. The viewer 212 may respond to the top-skill U I 1000 by selecting JAVA 1006.2 (as illustrated in FIG. 10).

The method 2300 may continue at operation 2308 with determining a skill validation value of the skill for the first member based on the response and a machine learning model. For example, skill validation prediction module 222 may determine skill validation value 214 for the skill JAVA based on the machine learning model 226 and the top skill selection 230.

The method 2300 may include one or more additional operations. One or more of the operations may be optional. In some embodiments, the operations may be performed in a different order.

Figure 24:
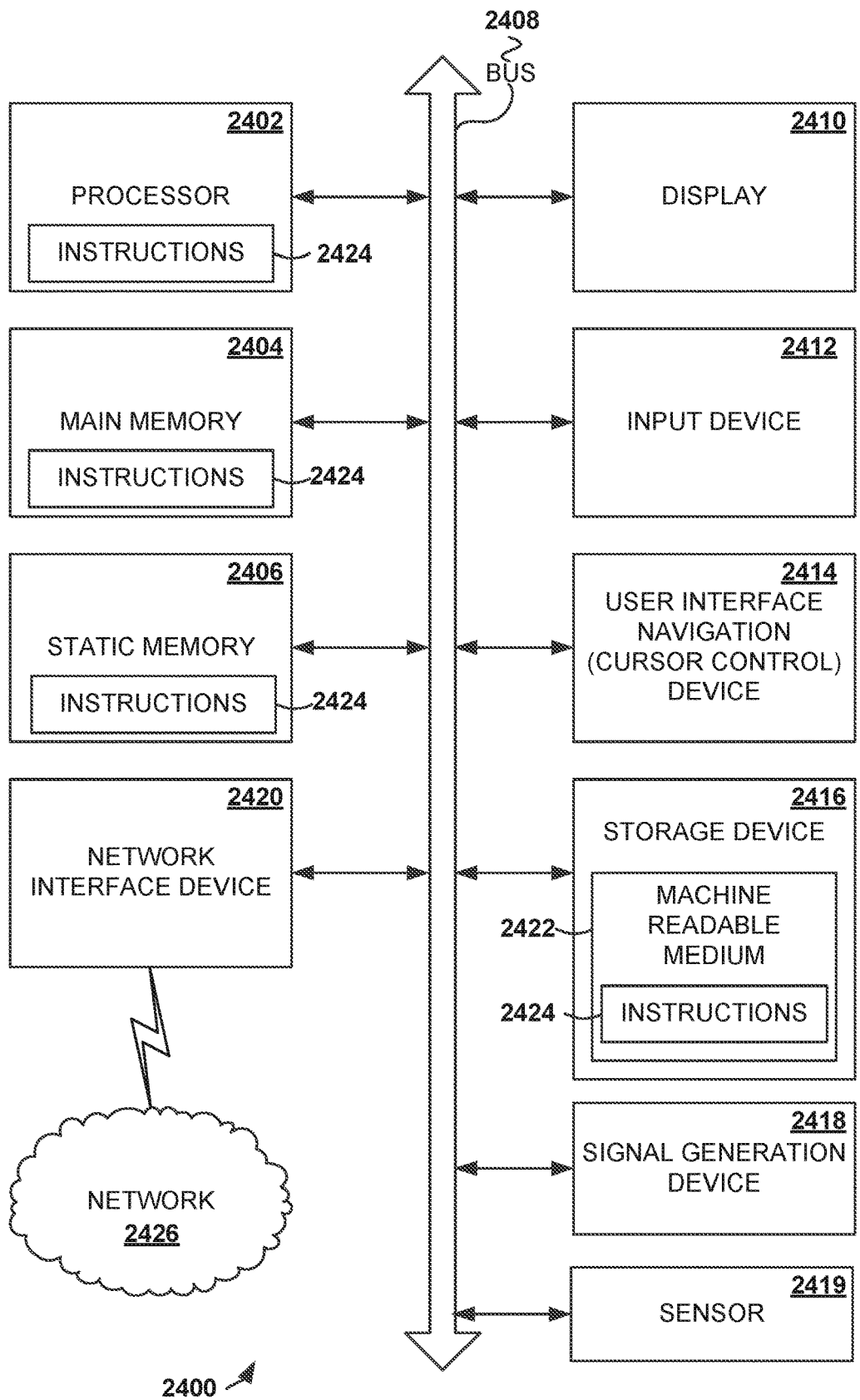
FIG. 24 shows a diagrammatic representation of the machine in the example form of a computer system and within which instructions (e.g., software) for causing the machine to perform any one or more of the methodologies discussed herein may be executed.

FIG. 24 shows a diagrammatic representation of the machine 2400 in the example form of a computer system and within which instructions 2424 (e.g., software) for causing the machine 2400 to perform any one or more of the methodologies discussed herein may be executed. In alternative embodiments, the machine 2400 operates as a standalone device or may be connected (e.g., networked) to other machines. In a networked deployment, the machine 2400 may operate in the capacity of a server machine or a client machine in a server-client network environment, or as a peer machine in a peer-to-peer (or distributed) network environment. The machine 2400 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 2424, sequentially or otherwise, that specify actions to be taken by that machine. Further, while only a single machine is illustrated, the term "machine" shall also be taken to include a collection of machines that individually or jointly execute the instructions 2424 to perform any one or more of the methodologies discussed herein in conjunction with FIGS. 1-23.

The machine 2400 includes a processor 2402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 2404, and a static memory 2406, which are configured to communicate with each other via a bus 2408. The machine 2400 may further include a graphics display 2410 (es., a plasma display panel (PDP), a light emitting diode (LED) display, a liquid crystal display (LCD), a projector, or a cathode ray tube (CRT)). The machine 2400 may also include an alphanumeric input device 2412 (e.g., a keyboard), a user interface navigation (cursor control) device 2414 (e.g., a mouse, a touchpad, a trackball, a joystick, a motion sensor, or other pointing instrument), a storage device 2416, a signal generation device 2418 (e.g., a speaker), a network interface device 2420, sensor 2419. Sensor 2419 may be a camera, a light sensor, sound sensor, etc.

The storage device 2416 includes a machine-readable medium 2422 on which is stored the instructions 2424 (e.g., software) embodying any one or more of the methodologies or functions described herein. The instructions 2424 may also reside, completely or at least partially, within the main memory 2404, within the processor 2402 (e.g., within the processor's cache memory), or both, during execution thereof by the machine 2400. Accordingly, the main memory 2404 and the processor 2402 may be considered as machine-readable media. The instructions 2424 may be transmitted or received over a network 2426 via the network interface device 2420.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2422 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 2400), such that the instructions, when executed by one or more processors of the machine (e.g., processor 2402), cause the machine to perform any one or more of the methodologies described herein. Accordingly, a "machine-readable medium" refers to a single storage apparatus or device, as well as "cloud-based" storage systems or storage networks that include multiple storage apparatus or devices. The teen "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived. therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system for verifying skills in an online connection network, the system comprising:
   a computer readable medium having instructions stored there on, which, when executed by a processor, cause the system to:
   training a machine learning model based on members confirmed to be hired to jobs described in job postings of the online connection network, wherein skills listed as required in the job postings are matched with skills listed in the profiles of the members, and wherein the matched skills listed in the profiles of the members are determined to be verified skills of the members;
   identify a skill of a first member of the online connection network;
   select two other members of the online connection network that are connected to a second member, wherein the first member and the second member are connected via the online connection network;
   cause to be presented a go-to-skill connection user interface (UI) to the second member, wherein the go-to-skill connection UI presents the indication of the first member, indications of the two other members, an indication of the skill, and a query regarding the competence of the skill possessed by the first member, wherein the query indicates the second member is to choose from the first member and the two other members as a go-to-connection for the skill;
   receive a response to the query;
   determine a skill validation value of the skill for the first member based on the response and the machine learning model; and
   in response to the first member being hired to a job described in a job posting that lists the skill as required, retraining the machine learning model based on the determined skill validation value and a value for a verified skill.

2. The system of claim 1, wherein the two other members of the online connection network are directly connected to the second member.

3. The system of claim 1, wherein select two other members of the online connection network that are connected to the second member further comprises:
   select the two other members of the online connection network that are connected to the second member based on a second machine learning model, wherein the second machine learning model is trained based on features comprising a skill reputation of the two other members, a measure of a strength of the relationship between the second member and the two other members, and a skill rank of the skill.

4. The system of claim 1, wherein the instructions further cause the system to:
   select two or more additional skills; and
   present a top skill UI to the second member, the top skill UI comprising the indication of the first member, the indication of the skill, indications of the two or more additional skills, and the query regarding the competence of the skill possessed by the first member, wherein the query regarding the competence of the skill possessed by the first member is for the second member to choose a top skill of the first member.

5. The system of claim 1, wherein the instructions further cause the system to:
   in response to the second member endorsing the first member for the skill, present an endorsement follow-up UI to the second member, the endorsement follow-up UI comprising the indication of the first member, the indication of the skill, indications of three or more ratings for the skill, and wherein the query regarding the competence of the skill possessed by the first member is for the second member to select one of the three or more ratings for the skill possessed by the first member.

6. The system of claim 1, wherein the instructions further cause the system to:
   present a UI element that requests that the second member indicate a relationship with the first member.

7. The system of claim 1, wherein the second member is connected to the first member by a first-degree connection within the online connection network.

8. The system of claim 1, wherein
   the features further comprise skill ranks of skills, skill reputations of members, and measures of strengths of the relationship between members.

9. The system of claim 8, wherein the machine learning model is one of the following group: a gradient boosting model, a non-parametric tree model, and a logistic regression model.

10. The system of claim 9, wherein the instructions further cause the system to:
    determine members that have applied for a job of a job posting, the job posting comprising one or more skills;
    determine which members were hired for the job; and
    verify the one or more skills for the members that were hired to the job.

11. The system of claim 1, wherein the instructions further cause the system to:
    update a profile of the first member with the skill validation value of the skill, wherein the profile comprising the skill validation value of the skill and an indication that the first member has indicated the first member possesses the skill.

12. The system of claim 11, wherein the instructions further cause the system to:
    determine a matching between a job posting and the first member based on matching skills listed in the job posting with the skill validation value of the skill.

13. A computer-implemented method for verifying skills in an online connection network, the method comprising:
    training a machine learning model based on members confirmed to be hired to jobs described in job postings of the online connection network, wherein skills listed as required in the job postings are matched with skills listed in the profiles of the members, and wherein the matched skills listed in the profiles of the members are determined to be verified skills of the members;

identifying a skill of a first member of the online connection network;
selecting two other members of the online connection network that are connected to a second member, wherein the first member and the second member are connected via the online connection network;
causing to be presented a go-to-skill connection user interface (UI) to the second member, wherein the go-to-skill connection UI presents the indication of the first member, indications of the two other members, an indication of the skill, and a query regarding the competence of the skill possessed by the first member, wherein the query indicates the second member is to choose from the first member and the two other members as a go-to-connection for the skill;
receiving a response to the query;
determining a skill validation value of the skill for the first member based on the response and the machine learning model; and
in response to the first member being hired to a job described in a job posting that lists the skill as required, retraining the machine learning model based on the determined skill validation value and a value for a verified skill.

14. The method of claim 13 further comprising:
selecting three other members of the online connection network that are connected to the second member; and
in response to the second member viewing a profile of the first member, presenting the go-to-skill connection UI to the second member, wherein the go-to-skill connection UI presents the indication of the first member, indications of the three other members, the indication of the skill, and the query regarding the competence of the skill possessed by the first member, wherein the query indicates the second member is to choose from the first member and the three other members as a go-to-connection for the skill.

15. The method of claim 13, wherein selecting two other members of the online connection network that are connected to the second member further comprises:
selecting the two other members of the online connection network that are connected to the second member based on a second machine learning model, wherein the second machine learning model is trained based on features comprising a skill reputation of the two other members, a measure of a strength of the relationship between the second member and the two other members, and a skill rank of the skill.

16. The method of claim 13, further comprising:
selecting two or more additional skills; and
presenting a top skill UI to the second member, the top skill UI comprising the indication of the first member, the indication of the skill, indications of the two or more additional skills, and the query regarding the competence of the skill possessed by the first member, wherein the query regarding the competence of the skill possessed by the first member is for the second member to choose a top skill of the first member.

17. A non-transitory machine-readable storage medium comprising instructions, which when implemented by one or more machines, cause the one or more machines to perform operations comprising:
train a machine learning model based on members confirmed to be hired to jobs described in job postings of the online connection network, wherein skills listed as required in the job postings are matched with skills listed in the profiles of the members, and wherein the matched skills listed in the profiles of the members are determined to be verified skills of the members; identifying a skill of a first member of the online connection network;
identify a skill of a first member of the online connection network;
select two other members of the online connection network that are connected to a second member, wherein the first member and the second member are connected via the online connection network;
cause to be presented a go-to-skill connection user interface (UI) to the second member, wherein the go-to-skill connection UI presents the indication of the first member, indications of the two other members, an indication of the skill, and a query regarding the competence of the skill possessed by the first member, wherein the query indicates the second member is to choose from the first member and the two other members as a go-to-connection for the skill;
receive a response to the query;
determine a skill validation value of the skill for the first member based on the response and the machine learning model; and
in response to the first member being hired to a job described in a job posting that lists the skill as required, retraining the machine learning model based on the determined skill validation value and a value for a verified skill.

18. The non-transitory machine-readable storage medium of claim 17, wherein the operations further comprise:
select the two other members of the online connection network that are connected to the second member based on a second machine learning model, wherein the second machine learning model is trained based on features comprising a skill reputation of the two other members, a measure of a strength of the relationship between the second member and the two other members, and a skill rank of the skill.

19. The non-transitory machine-readable storage medium of claim 17, wherein the operations further comprise:
select two or more additional skills; and
present a top skill UI to the second member, the top skill UI comprising the indication of the first member, the indication of the skill, indications of the two or more additional skills, and the query regarding the competence of the skill possessed by the first member, wherein the query regarding the competence of the skill possessed by the first member is for the second member to choose a top skill of the first member.

\* \* \* \* \*